United States Patent
Iwasaki et al.

(10) Patent No.: US 6,795,647 B2
(45) Date of Patent: Sep. 21, 2004

(54) FLASH CONTROL DEVICE AND FLASH CONTROL SYSTEM

(75) Inventors: Hiroyuki Iwasaki, Yokohama (JP); Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/629,610

(22) Filed: Jul. 30, 2003

(65) Prior Publication Data

US 2004/0151487 A1 Aug. 5, 2004

(30) Foreign Application Priority Data

Aug. 6, 2002 (JP) .......................................... 2002-228746
Nov. 15, 2002 (JP) .......................................... 2002-332150

(51) Int. Cl.[7] ............................................... G03B 15/05
(52) U.S. Cl. ..................... 396/56; 396/157; 396/164; 396/171; 396/176; 396/182; 348/371
(58) Field of Search ............................ 396/56, 157, 164, 396/176, 171, 182, 172; 315/241 P; 348/370, 371

(56) References Cited

U.S. PATENT DOCUMENTS 5,640,623 A * 6/1997 Sasaki ........................ 396/180
6,404,987 B1 * 6/2002 Fukui ........................... 396/56
6,512,890 B2 * 1/2003 Kawasaki et al. ........... 396/157
6,718,135 B2 * 4/2004 Kawasaki et al. ........... 396/182

FOREIGN PATENT DOCUMENTS

JP    A 11-190872    7/1999    ........... G03B/15/05

* cited by examiner

*Primary Examiner*—W. B. Perkey
(74) *Attorney, Agent, or Firm*—Oliff & Berridge, PLC

(57) ABSTRACT

A flash control device for controlling a slave SB that emits a flash upon receiving an operational instruction via optical communication has a flash emitting part for emitting an optical signal used for the optical communication, and a power supply detecting part detecting the attachment of a power pack. The detection result is transmitted to a camera microcomputer via an SB microcomputer. A communication intensity designating part and a communication intensity determining part decide, based on the detection result received via the camera microcomputer, the intensity of the optical signal to be emitted by the flash emitting part.

16 Claims, 30 Drawing Sheets

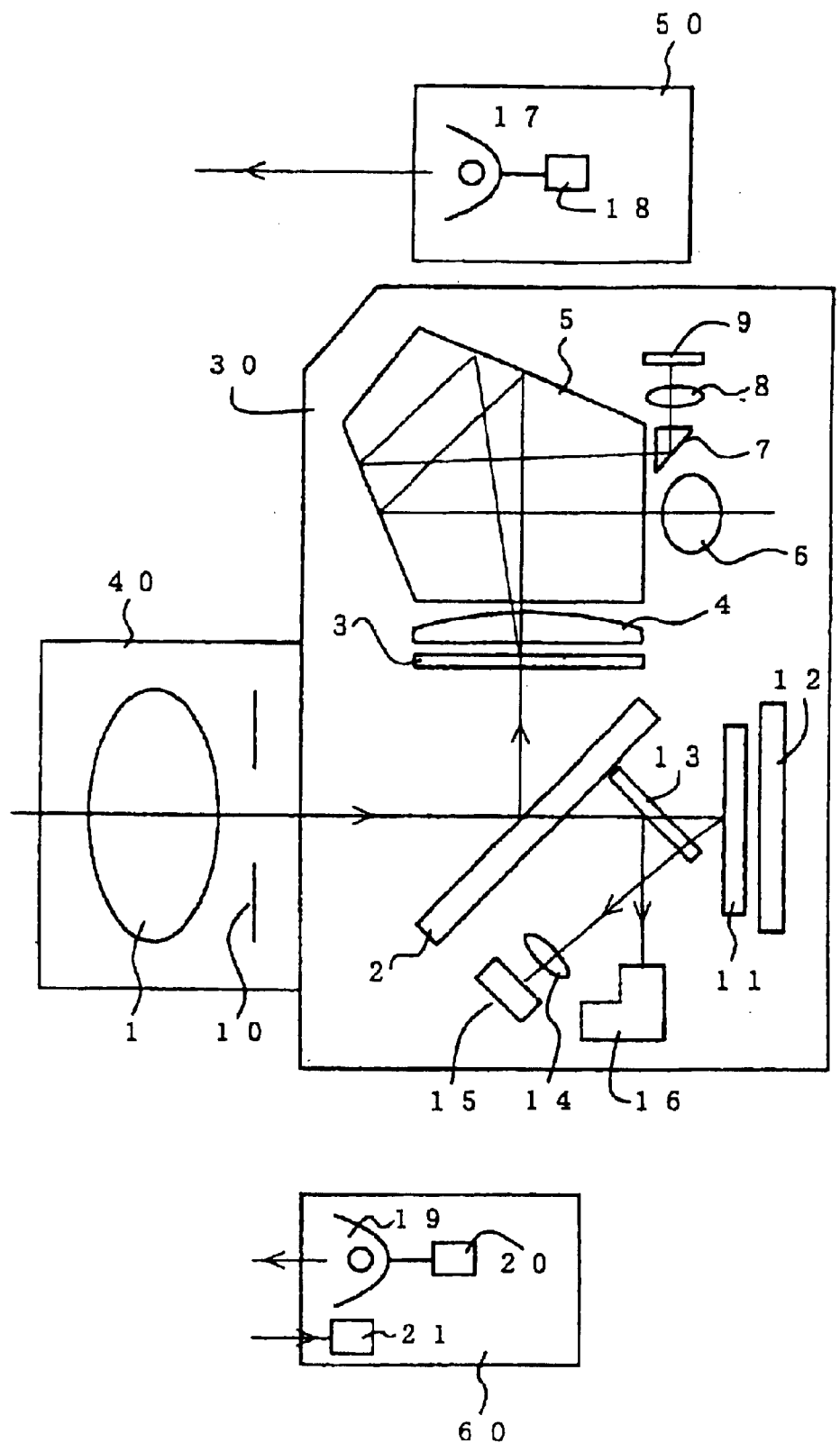
F I G. 1

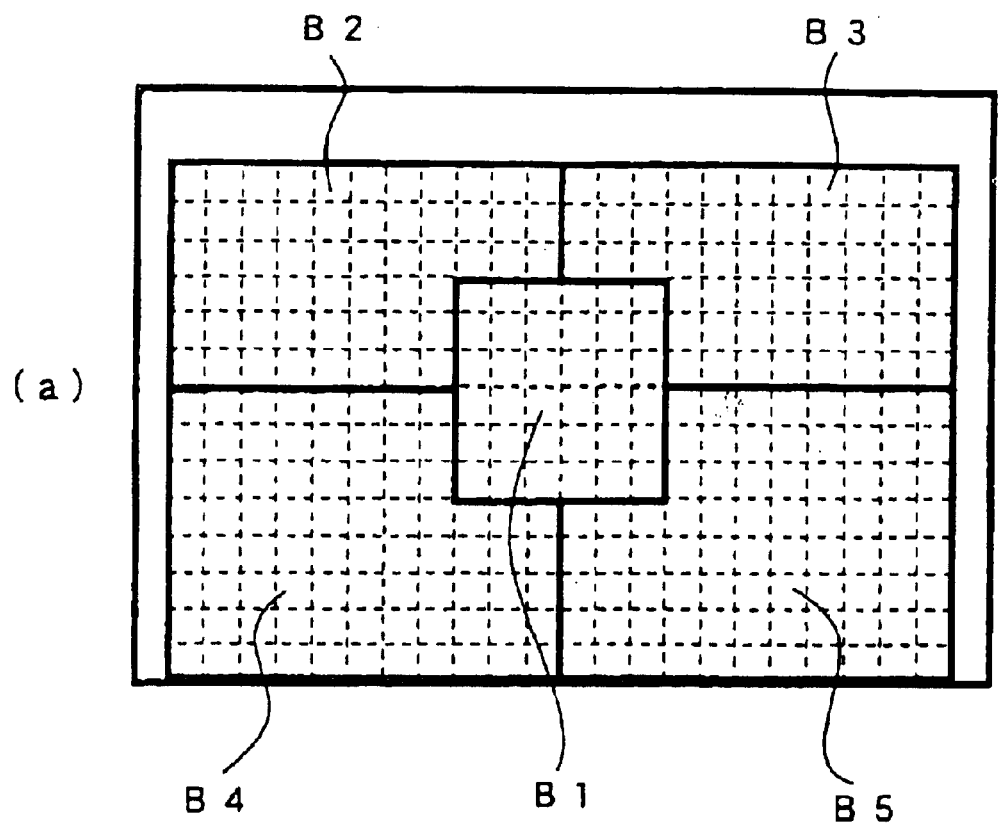
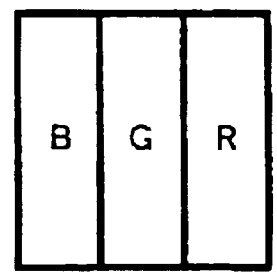
F I G. 3

(a)
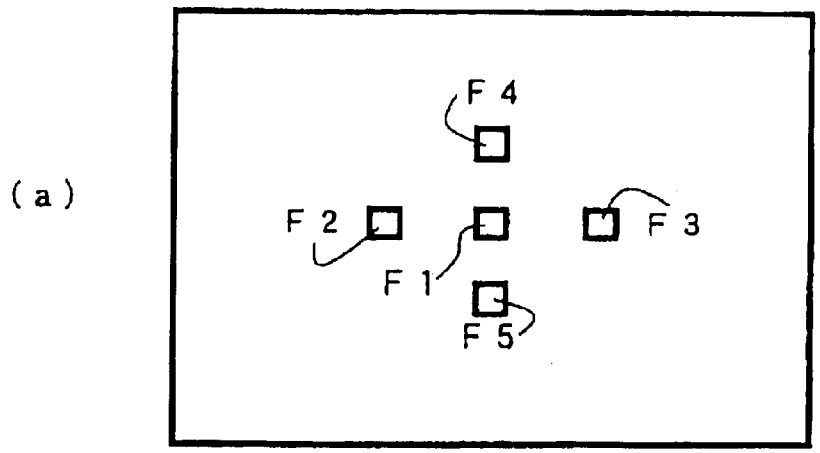
(b)
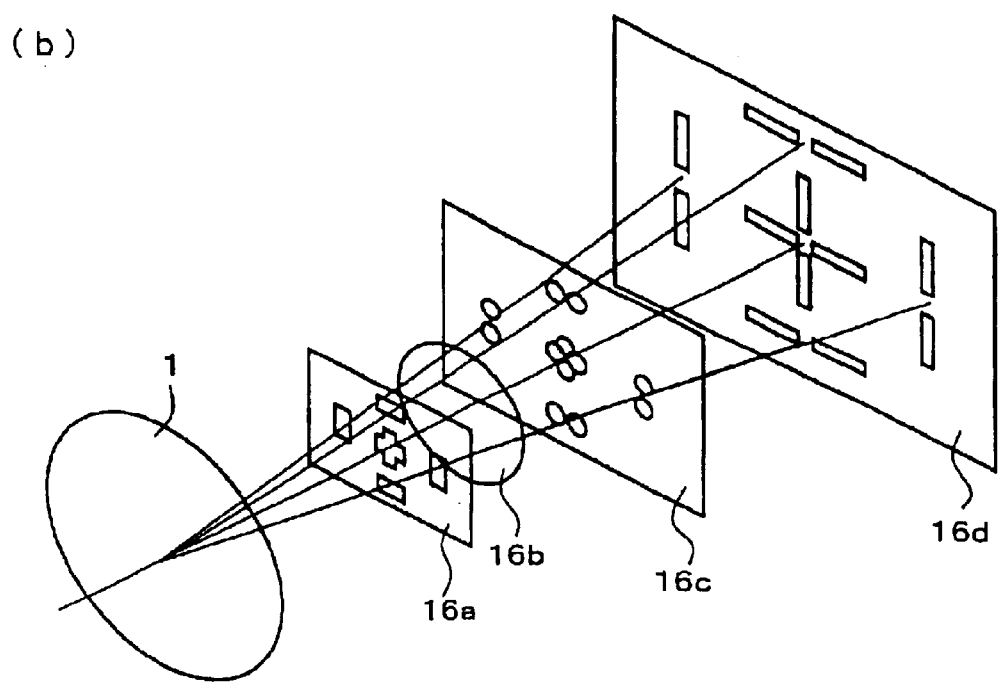
FIG. 4

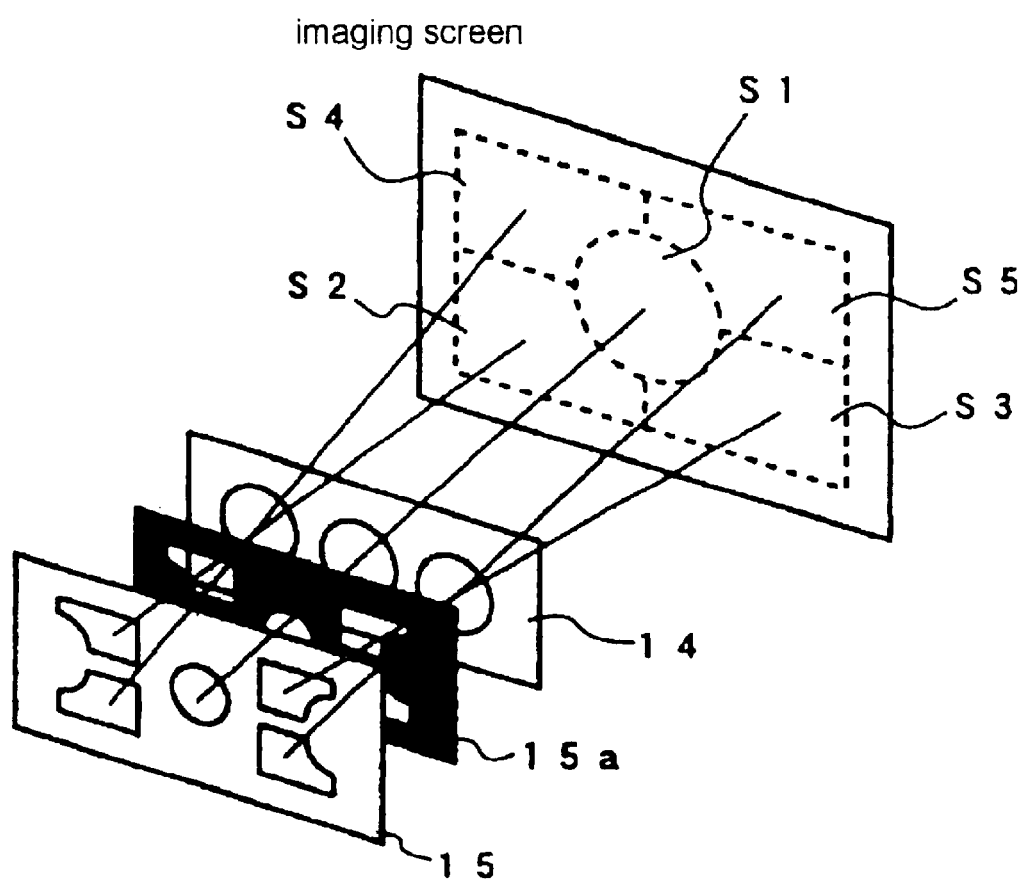
F I G. 5

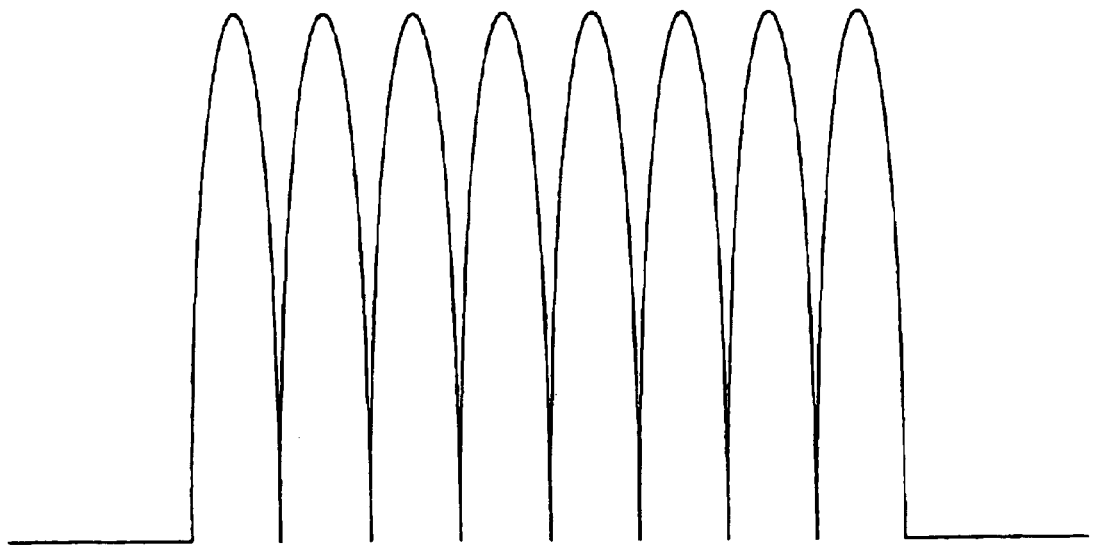
| 1 fixed | GN level designation | gruop designation | mode designation | CH designation |
(KGN)
$$\begin{pmatrix} 0 \\ 1 \\ 2 \\ 3 \end{pmatrix} \begin{pmatrix} A \\ B \\ C \\ ALL \end{pmatrix} \begin{pmatrix} \text{main light emission} \\ \text{preliminary light emission} \end{pmatrix} \begin{pmatrix} 0 \\ 1 \\ 2 \\ 3 \end{pmatrix}$$
F I G. 13

(a)
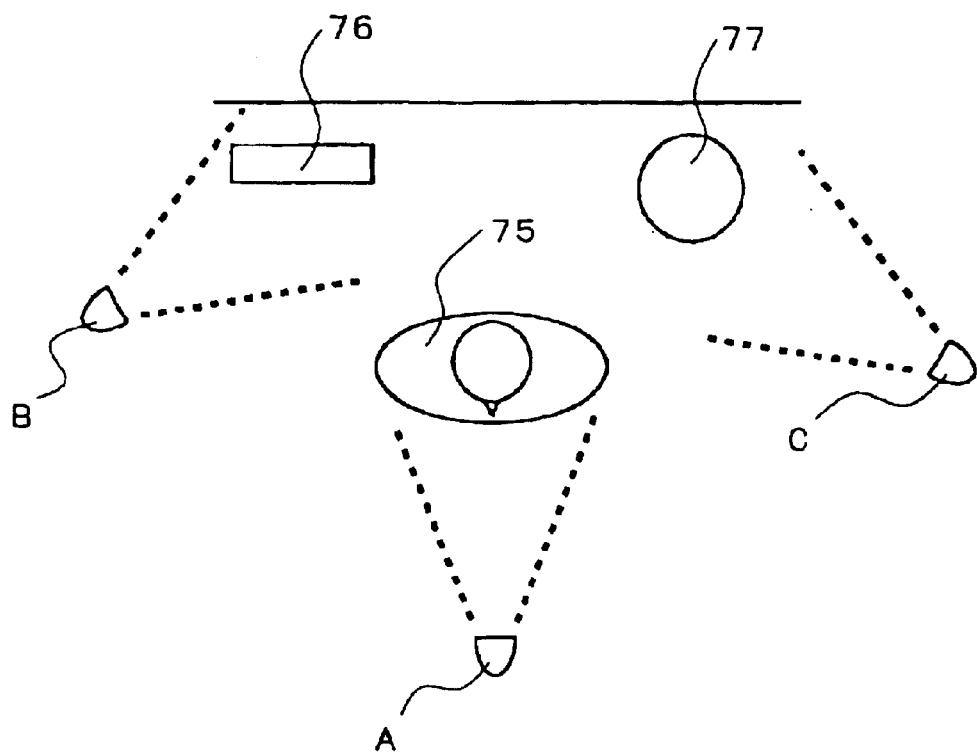
(b)
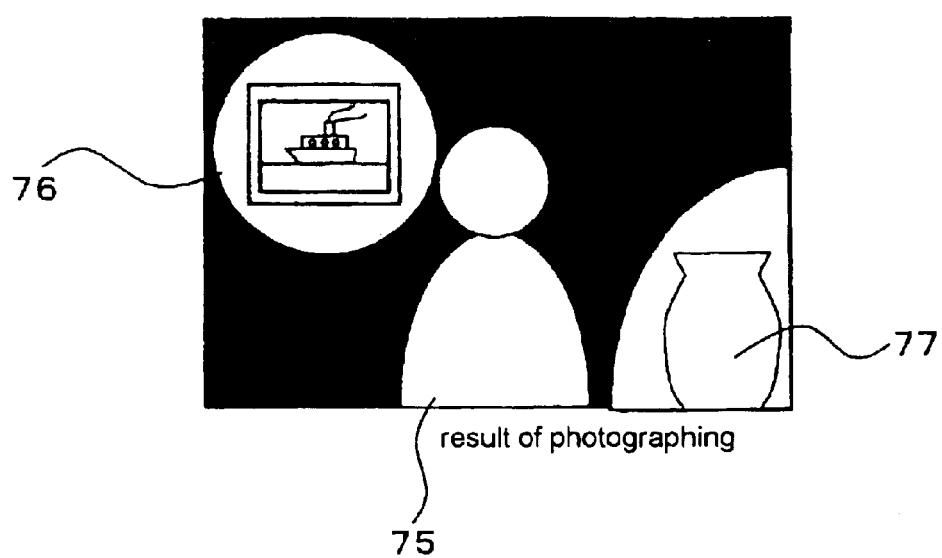
result of photographing
FIG. 22 unit: Guide Number

|  | communication intensity increase not designated | communication intensity increase designated |
|---|---|---|
| master SB only | 0.7 | 1.0 |
| master SB plus power pack | 1.0 | 1.4 |
| master SB only (no main master light emission) | 1.0 | 1.4 |
| master SB plus power pack (no main master light emission) | 1.4 | 2.0 |
| dedicated commander | 1.4 | 2.0 |

F I G. 2 4

(a) normal wireless multi-flash photographing on screen display

```
WIRELESS MODE

MASTER    TTL    +1
SLAVE-A   TTL    ±0
SLAVE-B   TTL    +0.5
SLAVE-C   MAN    GN30
```

(b) commander mode for wireless multi-flash photographing

```
WIRELESS MODE

MASTER    ---
SLAVE-A   TTL    ±0
SLAVE-B   TTL    +0.5
SLAVE-C   MAN    GN20
```

FIG. 29

FLASH CONTROL DEVICE AND FLASH CONTROL SYSTEM

CROSS REFERENCE TO RELATED APPLICATION

This application is based upon and claims the benefit of priority from the prior Japanese Patent Application Nos. 2002-228746, filed on Aug. 6, 2002, and 2002-332150, filed on Nov. 15, 2002, the entire contents of which are incorporated herein by reference.

BACKGROUND OF THE INVENTION

1. Field of the Invention

This invention relates to a flash control device and a flash control system for wirelessly controlling a flash device through optical communication.

2. Description of the Related Art

Japanese Unexamined Patent Application Publication No. Hei 11-190872 has proposed a device that changes the light emission amount of the optical communication in accordance with the amount of information to be transmitted. It has also proposed a device that determines the charge status of a capacitor and controls the light emission amount of the optical communication in accordance with the determined status.

It is desirable that devices of these types have a long controllable wireless distance because a longer controllable distance leads to a wider use range of the devices. It is, therefore, desirable that signals can travel as far as possible. To lengthen the reachable distance of the signals, the intensity of the optical signals need to be high and hence the optical signals need to be emitted at intensity as high as possible.

However, in a case where a flash emitting part for photographing is also used as an optical signal transmitting part, there has been a problem that heightening the intensity of the optical communication results in reducing the power available during photographing, which reduces the amount of light emission at the photographing.

According to the conventional technique for controlling slave flash devices (wireless electronic flashes) by use of preliminary light emission, a master flash device (main electronic flash) has to consume a large amount of power for the preliminary light emission and for generation of small-light-emission pulses in order to communicate with the slave flash devices, resulting in significantly reduced power left for main light emission. Actually, it is more accurate to say that minimum light emission power required for a main flash emission of the master flash device is secured first and then the power required for the preliminary light emission and small-light-emission pulses for the communication is secured from the remaining power. Consequently, the light amount of the small-light-emission pulses for the communication has to be significantly reduced, so that the distance in which the slave flash devices are receivable of the small-light-emission pulses for the communication is limited to a short distance.

Therefore, in the case of a long distance between the master flash and the slave flash devices or of communicating by use of light emission pulses reflected from peripheral objects or the like because no lines of sight therebetween are secured due to its surrounding environment at the photographing, the slave flash devices cannot obtain sufficient reception intensity resulting in failure of communication, or may result in a malfunction due to a poor communication. Conventionally, it is impossible to flexibly change the optical communication intensity by properly determining whether the light emission intensity for optical communication is increasable or has to be increased.

The technique for determining the charge status of the capacitor disclosed in the foregoing Japanese Unexamined Patent Application Publication No. Hei 11-190872 is intended for preventing occurrence of a failure in optical signal emission by reducing the light mission amount during a low charge voltage. This way of control, however, may cause the slave flash devices to be unstable in operation such as a malfunction or a failure in emitting slave light due to a lack of light emission amount for the optical signals.

The foregoing Japanese Unexamined Patent Application Publication No. Hei 11-190872 describes the light emission during the communication, yet it does not consider the illumination during a main light emission. Particularly, for a small-sized or built-in camera flash device or the like with a small power capacity (capacitor value), the optical communication is unfeasible if a large amount of power is consumed for the illumination during the main light emission; to the contrary the illumination amount thereof becomes insufficient or the main light emission is unfeasible if a large amount of power is consumed for the optical communication.

SUMMARY OF THE INVENTION

Then, it is an object of the present invention to provide a flash control device and a flash control system that are able to establish proper intensities of optical communication in accordance with various conditions at the time of photographing.

It is another object of the present invention to provide a flash control device and a flash control system that are able to appropriately control slave flash devices even when a master flash device has small power capacity and far from the slave flash devices, or communication between the master flash device to the slave flash devices has to be made by light emission pulses reflected from a peripheral object or the like because the surrounding environment obstructs a line of sight from the master flash device to the slave flash devices at the time of photographing.

The present invention will be described below.

(1)

A flash control device of the present invention controls a slave flash device that emits upon receiving an operational instruction via optical communication. The flash control device includes: a signal emitting part for emitting an optical signal used for the optical communication; a power determining part for determining a state of supply of power to be used for the light emission of the signal emitting part; and a communication intensity deciding part for deciding, based on a determination result from the power determining part, the intensity of the optical signal to be emitted by the signal emitting part.

(2)

In the flash control device of the above item (1), the signal emitting part is preferably able to emit a flash serving as illumination at the time of photographing.

(3)

In the flash control device of the above item (2), the communication intensity deciding part preferably increases the signal intensity of the optical signal emitting part when illumination is set to be provided at the time of photographing.

(4)

In the flash control device of the above item (1), the communication intensity deciding part preferably increases the intensity of the optical signal to be emitted by the optical signal emitting part when the flash control device is provided with an external power supply device in its exterior for additional supply of the power to be used for the light emission of the signal emitting part.

(5)

In the flash control device of the above item (4), the signal emitting part is preferably able to emit a flash serving as illumination at the time of photographing.

(6)

In the flash control device of the above item (5), the communication intensity deciding part preferably increases the signal intensity of the optical signal emitting part when no illumination is set to be provided at the time of photographing.

(7)

Another flash control device of the present invention controls a slave flash device that emits a flash upon receiving an operational instruction via optical communication. The flash control device includes: a signal emitting part for emitting an optical signal used for the optical communication; a slave flash determining part for determining whether or not the slave flash device has emitted preliminary slave light, in accordance with the optical signal emitted by the signal emitting part; and a communication intensity deciding part for increasing the intensity of the optical signal to be emitted by the optical signal emitting part when the slave flash determining part determines that the preliminary slave light has not been emitted.

(8)

In the flash control device of the above item (7), the signal emitting part is preferably able to emit a flash serving as illumination at the time of photographing.

(9)

In the flash control device of the above item (8), the communication intensity deciding part preferably increases the signal intensity of the optical signal emitting part when no illumination is set to be provided at the time of photographing.

(10)

Another flash control device of the present invention controls a slave flash device that emits a flash upon receiving an operational instruction via optical communication. The flash control device includes: a signal emitting part for emitting an optical signal used for the optical communication; a photometry part for measuring the brightness of a subject field; and a communication intensity deciding part for deciding, based on a measurement result from the photometry part, the intensity of the optical signal to be emitted by the signal emitting part.

(11)

A flash control system of the present invention includes: a photographing device; a slave flash device that emits a flash upon receiving an operational instruction via optical communication; and a signal emitting part for emitting an optical signal used for the optical communication. The signal emitting part is attached to the photographing device and changeably functions as a light/signal emission device that can emit a flash serving as illumination at the time of photographing and a dedicated signal emission device that emits the optical signal to only give an operational instruction to the slave flash device. The photographing device sets the intensity of the optical signal to be emitted by the dedicated signal emission device to be greater than the intensity of the optical signal to be emitted by the light/signal emission device.

(12)

Another flash control system of the present invention includes: a photographing device; a slave flash device that emits a flash upon receiving an operational instruction via optical communication; and a signal emission device attached to the photographing device and having a signal emitting part for emitting an optical signal used for the optical communication, and it further includes: a photometry part provided in the photographing device and/or in the signal emission device for measuring the brightness of a subject field; and a communication intensity deciding part for deciding, based on a measurement result from the photometry part, the intensity of the optical signal to be emitted by the signal emitting part.

(13)

Another flash control device of the present invention controls a slave flash device that emits a flash upon receiving an operational instruction via optical communication. The flash control device includes: a signal emitting part capable of emitting an optical signal used for the optical communication and of emitting a flash serving as illumination at the time of photographing; and a communication intensity deciding part for deciding the intensity of the optical signal to be emitted by the signal emitting part. When the signal emitting part does not illuminate at the time of photographing, the communication intensity deciding part sets the signal intensity of the optical signal emitting part to be greater than when the signal emitting part illuminates at the time of photographing.

(14)

Another flash control device of the present invention controls a slave flash device that emits a flash upon receiving an operational instruction via optical communication. The flash control device includes a signal emitting part capable of emitting an optical signal used for the optical communication and of emitting a flash serving as illumination at the time of photographing; and a communication intensity deciding part for deciding the intensity of the optical signal to be emitted by the signal emitting part. When the slave flash device is set to be controlled, the communication intensity deciding part inhibits the signal emitting part from illuminating at the time of photographing.

(15)

In the flash control device of the above item (14), the signal emitting part is preferably a flash device built in the photographing device.

(16)

In the flash control device of the above item (14), preferably the communication intensity deciding part does not inhibit the signal emitting part from illuminating at the time of photographing when the photographing device is provided with an external flash device as the signal emitting part which has a light emission capacity greater than a predetermined value, even when the slave flash device is set to be controlled.

BRIEF DESCRIPTION OF THE DRAWINGS

FIG. 1 is a diagram showing the optical system of a multi-flash flash control system of a camera according to a first embodiment of the present invention.

FIG. 3 is a diagram showing the division of a fixed-light photometry part of the present embodiment.

FIG. 4 is a diagram showing the regions and optical system of the focus detecting part of the present embodiment.

FIG. 5 is a diagram showing the optical system of the flash photometry part, and the division of the photometry regions of the flash photometry part.

FIG. 13 is a diagram for explaining the pulses of an optical signal and their functions.

FIG. 22 is a diagram simply showing a state of an increased-flash photographing.

FIG. 24 is a table showing the relationship between setting conditions and communication intensities.

FIG. 29 is an example of a screen display when the master SB in the present embodiment is in a wireless multi-flash photographing mode.

DESCRIPTION OF THE PREFERRED EMBODIMENTS

Figure 2:
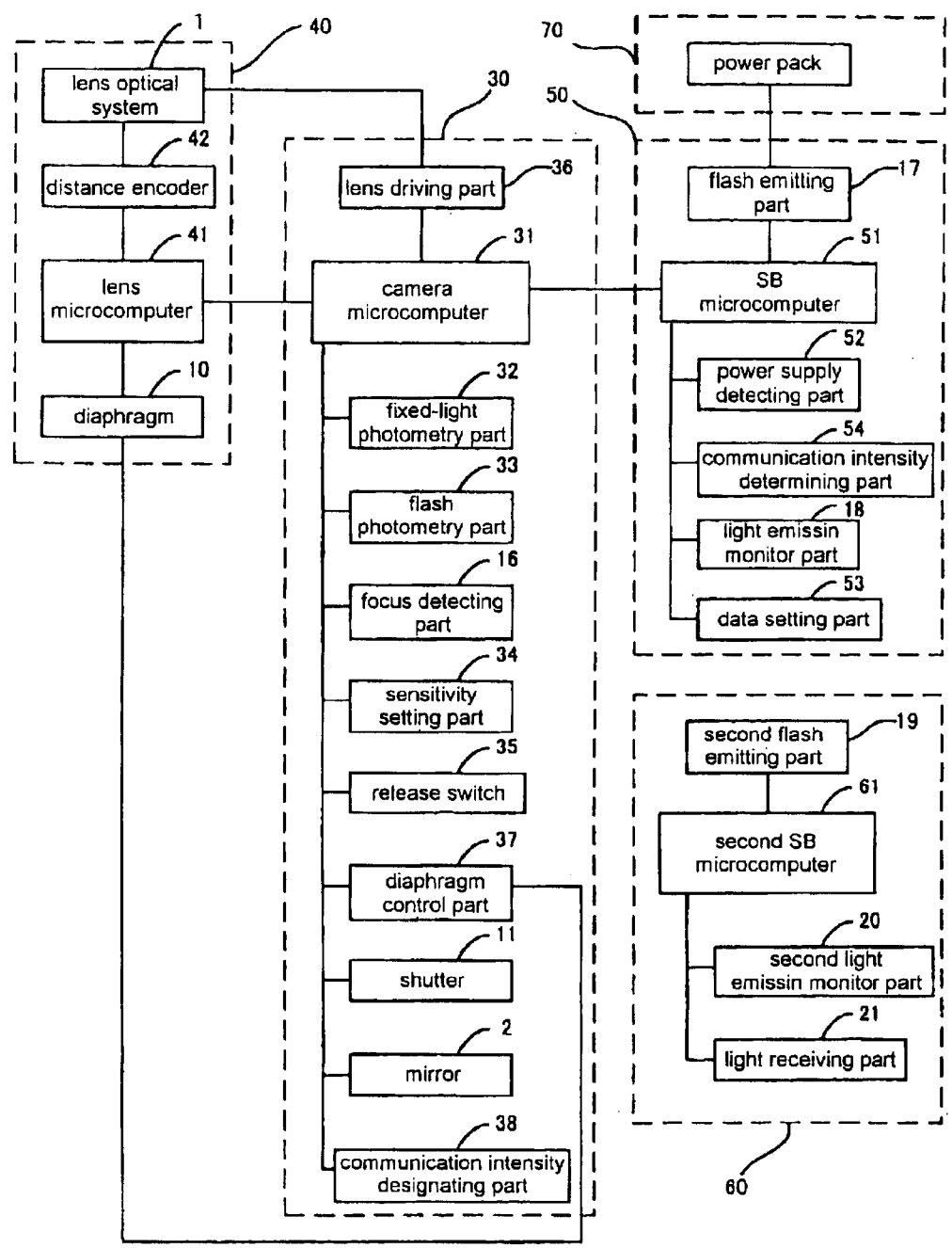
FIG. 2 is a block diagram showing a schematic structure of the embodiment of the present invention.

Embodiments of the present invention will be described below in greater detail with reference to the drawings.

First Embodiment

FIG. 1 is a diagram showing the optical system of a multi-flash control system of a camera according to a first embodiment of the present invention.

This multi-flash flash control system is constituted of a camera body 30, a lens body 40, a master flash device (which will be referred to as "master SB" hereinafter) 50, a slave flash device (which will be referred to as "slave SB" hereinafter) 60 and so on.

During other than photographing, under a circumstance where the SBs (flash devices) emit no light, a so-called "ambient light" travels through a lens 1, and is reflected upward by a main mirror 2 and once focused on a diffusing screen 3, and then further travels through a condensing lens 4, a pentaprism 5 and through an ocular lens 6, reaching the eye of a camera photographer.

On the other hand, a part of a light flux as diffused by the diffusing screen 3 travels through the condensing lens 4, the pentaprism 5, a photometry prism 7 and through a photometry lens 8, being focused again on a fixed-light photometry element 9.

The photometry element 9 including a light receiving element such as a CCD (charge coupled device) or the like is so configured as to divide a subject field into 22×15=330 regions for photometry as shown in FIG. 3(a) and output the respective photometric values.

Each of the regions, which has a three-color photometric cell for R (red), G (green) and B (blue) as shown in FIG. 3(b), can divide a color into the three colors for photometry.

During a photographing using no wireless control, initially, a diaphragm 10 is stopped downed to a predetermined value, and at the same time, the main mirror 2 is pushed up. Thereafter, a light flux emitted, as preliminary light, from a flash emitting part 17 of the master SB 50 is reflected by a subject, and then substantially focused by the lens 1 onto a shutter 11.

A part of a light flux as reflected and diffused by the shutter 11 is guided through a dimmer lens 14 and focused again onto a dimmer element 15, thereby performing a flash photometry. During a main light emission, the shutter 11 is opened and a light flux is focused onto the light receiving surface of an imaging sensor 12 including, for example, a CCD or the like.

The dimmer element 15 constituted of SPDs, capacitors for accumulating optical current from the SPDs, amplifiers and so on, has been divided into five regions S1 through S5, as shown in FIG. 5, which correspond to B1 through B5 of FIG. 3, respectively.

In a case of a wireless control, a preliminary light emission is performed with the diaphragm 10 being open and the main mirror 2 being in a down position, and the reflected light is photometered by the photometry element 9 in the same manner as the fixed-light photometry.

The main mirror 2 functions as a half mirror that passes a part of light therethrough. A part of the passing light flux is bent downward by a submirror 13 and guided to a focus detecting part 16 including, for example, a CCD or the like. The focus detecting part 16 detects focusing states of focus detection regions F1 through F5 of a subject field as shown in FIG. 4. The lens 1 is driven until any one of the focus detection regions is in in-focus state. Which of the focus detection regions will be focused is determined by a photographer's manual selection, a closest-subject selection or the like.

The master SB 50 includes the flash emitting part 17 that also serves as a signal emitting part, and a light emission monitor part 18 for monitoring the light emission amount of the master SB 50 itself. The slave SB 60 includes a second flash emitting part 19, a second light emission monitor part 20 for monitoring the light emission amount of the slave SB 60, and a light receiving part 21.

FIG. 2 is a block diagram showing a schematic structure of the embodiment of the present invention.

Parts within the camera body 30 are all under the control of a camera microcomputer 31 being a microprocessor. The control performed therein is mainly of photometry and exposure control, auto-focus control, master SB control, and slave SB control to be described below.

<In Relation With Photometry and Exposure>

A fixed-light photometry part 32 is a circuit that divides the subject field into 22×15=330 regions, as shown in FIG. 3, to perform a photometry, and its photometry output is supplied to the camera microcomputer 31. The camera microcomputer 31 calculates an appropriate exposure value concerning the fixed-light exposure, based on: the output from the fixed-light photometry part 32; lens information such as the open F value, focal distance and exit pupil position of the lens (lens optical system) 1, stored in a lens microcomputer 41 provided in the lens body 40; sensitivity information of the imaging sensor 12 from a sensitivity setting part 34; and so on. Further, the camera microcomputer 31 resolves the calculated exposure value into a diaphragm stop value and a shutter value which are outputted to a diaphragm control part 37 and the shutter 11. The diaphragm control part 37 controls the stop-down/return of the diaphragm 10 in response to a release signal form a release switch 35.

<In Relation with Auto-focus>

The focus detecting part 16 detects a focus state with respect to the five regions of the subject field, as shown in FIG. 4. Its information is processed by the camera microcomputer 31 to obtain a lens drive amount which is outputted to a lens drive part 36, whereby the lens drive part 36 drives the lens optical system 1 of the lens body 40 to an in-focus state.

<In Relation with Master SB Control>

The camera microcomputer 31 calculates a set gain of a flash photometry part 33 based on a photometry value, a diaphragm stop value, a sensitivity value, a distance value, the bounce status of the flash emitting part and so on, to perform the gain setting thereof. Thereafter, the camera microcomputer 31 causes, via an SB microcomputer 51 in the body of the master SB 50, the flash emitting part. 17 to emit preliminary light. Then, the flash photometry part 33 integrates an optical current in accordance with the amount of the subject-reflected light. The camera microcomputer 31 calculates a value for designating the amount of a main light emission according to the integrated value, and outputs the calculated value to the SB microcomputer 51.

The SB microcomputer Sl calculates a main light emission amount from this main light emission amount designating value and a preliminary light emission value obtained by performing a photometric processing by use of the light emission monitor part 18, and uses a light emission trigger signal (X-signal) at the photographing to emit main light, and adjusts the light emission amount to a proper amount.

The SB microcomputer 51 also serves, together with a power supply detecting part 52, as a power determining part for determining a supply state of a power available to the light emission of the flash emitting part 17, and can detect a connection of a power pack 70 that is an external power supply device.

<In Relation with Slave SB Control>

The camera microcomputer 31 causes, via the SB microcomputer 51 in the body of the master SB 50, the flash emitting part 17 or the second flash emitting part 19 to perform a preliminary light emission, and then causes the fixed-light photometry part 32 to integrate an optical current in accordance with the amount of the subject-reflected light. The camera microcomputer 31 calculates, based on the integrated value, a value for designating the amount of a main light emission, and outputs the calculated value to the SB microcomputer 51. The SB microcomputer 51 calculates a main light emission amount from this main light emission amount designating value and a preliminary light emission value obtained by performing a photometric processing by use of the light emission monitor part 18, and uses a light emission trigger signal (X-signal) during photographing to emit main light, and adjusts the light emission amount to a proper amount.

A multi-flash control mode (which will be described later) is set, by the photographer, to a data setting part 53.

When the light receiving part 21 receives an optical signal, the second SB microcomputer 61 calculates a main light emission amount from the main light emission amount designating value and a preliminary light emission value obtained by performing a photometric processing by use of the second light emission monitor part 20, and uses a light emission trigger signal (X-signal) at the photographing to emit main light, and adjusts the light emission amount to a proper amount.

FIG. 3(a) is a diagram showing the division of the photometry element 9 in relation to the subject field. The photometry element 9 is so configured as to divide nearly the whole of the subject field into 330 regions, and perform photometry processings, and output their respective photometry values. The photometry element 9 is also so configured as to output photometry values of regions B1 through B5 which are formed by equally dividing its photometry regions in conformity with the division of the flash photometry part 33.

FIG. 3(b) is a diagram showing the division of each photometry region into three-color photometric regions of R, G and B.

FIG. 4(a) is a diagram showing the detecting regions of the focus detecting part 16 in relation to the subject field. The focus detecting part 16 is so configured as to detect a focus state with respect to each of the five regions F1 through F5.

FIG. 4(b) is a diagram showing, in a detailed manner, the optical system of the focus detecting part 16 including the lens 1, a field mask 16a, a field lens 16b, a separator lens 16c and an AF sensor 16d.

FIG. 5 is a diagram showing the optical system of the flash photometry part 33 and the division of the photometry regions of the flash photometry part 33. A subject image incident and focused on the shutter surface is focused again onto the dimmer element 15 by three dimmer lenses 14, and then divided into the five regions S1 through S5, whereby the respective photo-electrically converted charges are accumulated. The numbers of the regions S1 through S5 correspond to the numbers of the photometry regions B1 through B5 in FIG. 3(a). An aperture mask 15a blocks the light incident from the adjacent lenses from entering as stray light into the sensor.

Figure 6:
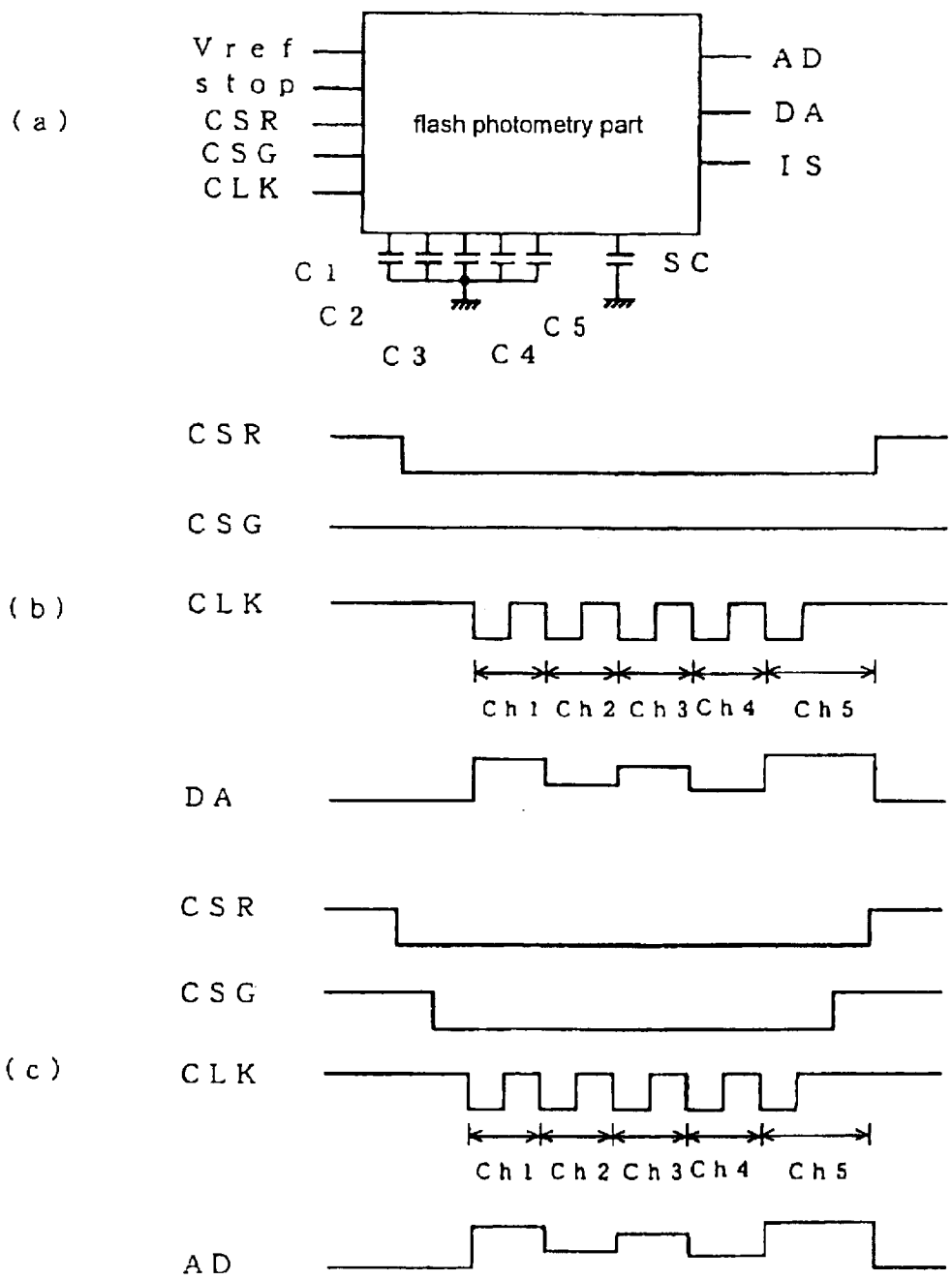
FIG. 6 is a diagram showing the terminals of a dimmer element of the present embodiment and their functions for simple explanation.

FIG. 6(a) is a diagram for simple explanation of the terminals of the dimmer element 15 and their functions. Labels "C1" through "C5" designate external capacitors for accumulating optical currents of the regions S1 through S5, respectively. A label "SC" designates an external capacitor for adding and accumulating the optical currents of regions S1 through S5 so as to provide a stop signal. A label "Vref" designates a voltage-proportional-to-temperature output terminal. A label "stop" designates a stop signal output terminal. Labels "CSR", "CSG" and "CLK" designate terminals for switching the settings of amplifier gains and read channels. These settings will be described later with reference to FIGS. 6(b) and 6(c).

A label "IS" designates a terminal for performing accumulation initiation/termination. A label "DA" designates a terminal for inputting amplifier gains of the regions. A label "AD" designates an output terminal of the photometry-integrated values of the regions.

FIG. 6(b) is a diagram showing the settings of the amplifier gains of the regions of the dimmer element 15. While the CSG terminal is kept at a high level, the CSR terminal is brought down to a low level, and thereafter a clock signal is inputted to the CLK terminal, whereby channel switching is made in synchronism with the falling-down of the clock signal to the low level. During the CLK terminal of the low level, the DA terminal is allowed to have a voltage level in accordance with set gains, thereby setting the gains of the channels. Labels "Ch1" through "Ch5" correspond to S1 through S5, respectively.

FIG. 6(c) is a diagram showing the reading of the photometry-integrated values of the regions of the dimmer element 15. After the CSR and CSG terminals are brought down to the low levels, a clock signal is inputted to the CLK terminal, whereby channel switching is made in synchronism with the falling-down of the clock signal to the low level. As a result, the photometry-integrated values of the regions are adjusted to ones of voltage levels in accordance with the photometry values, and these voltage levels are outputted to the AD terminal.

Figure 7:
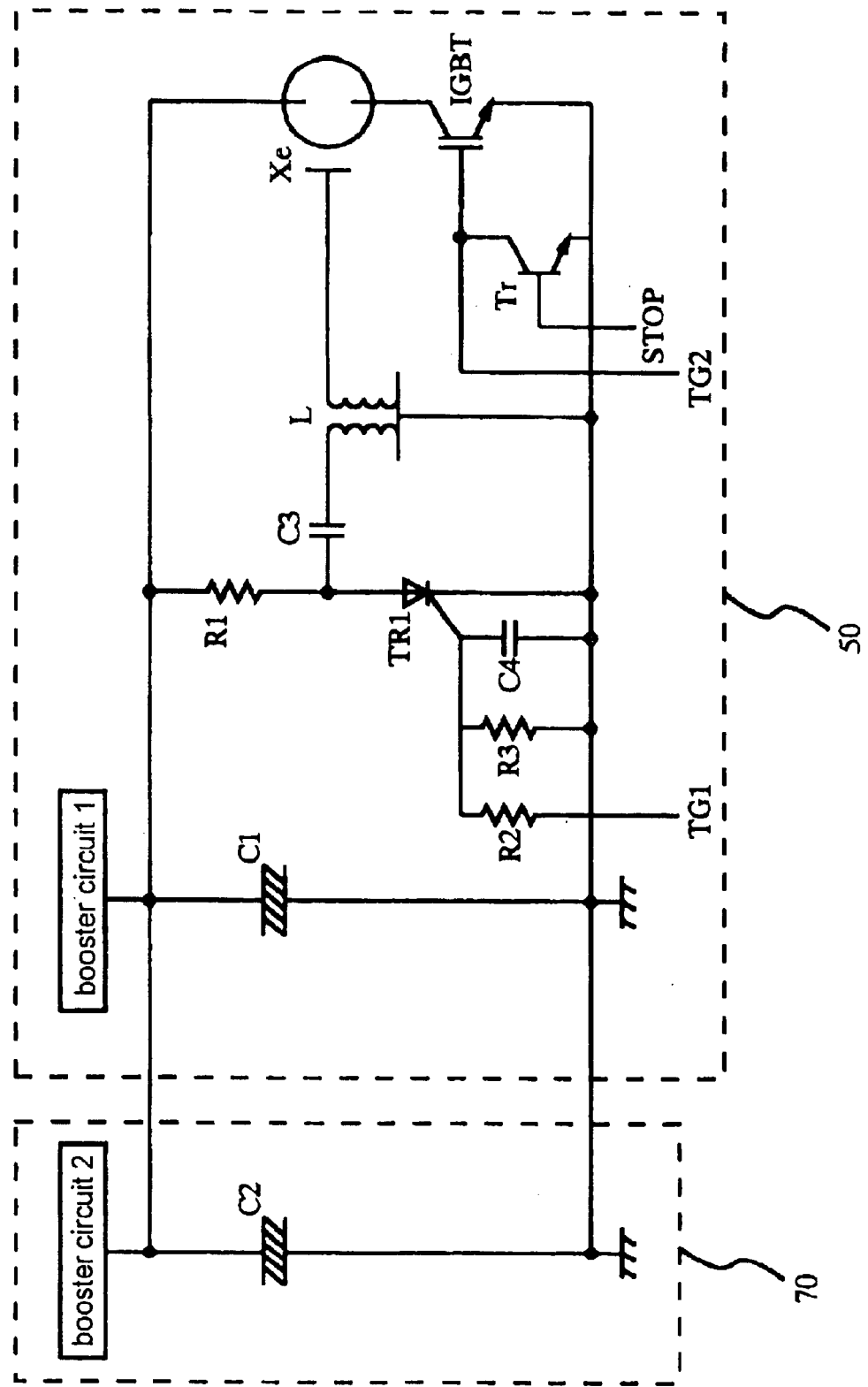
FIG. 7 is a diagram simply showing the power supply system of the body of a master SB.

FIG. 7 is a diagram simply showing the power supply system of the body of the master SB 50. Without the power pack 70, only a main capacitor C1 in the body of the master SB 50 supplies the power to be used for the flash emission. With the power pack 70, a capacitor C2 in the power pack is coupled in parallel. The capacitor C2 in the power pack has a capacity enough to accumulate the power at least as much as that of the main capacitor C1. In this way, the light emission power of the master SB can be doubled or more.

Figure 8:
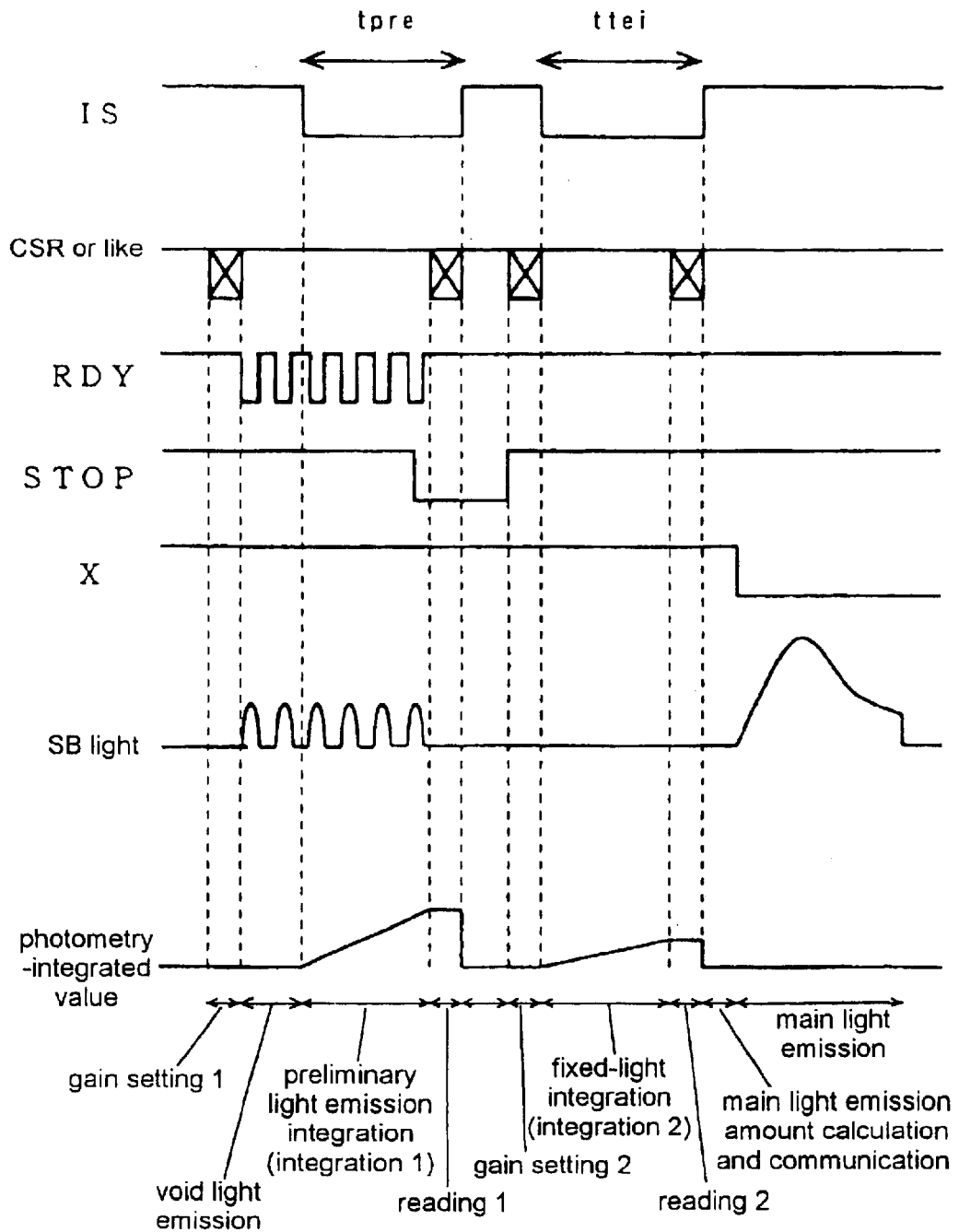
FIG. 8 is a timing chart for simple explanation of the basic operations during a release.

FIG. 8 is a timing chart for concise explanation of the basic operations at the release. For simple explanation, description will be made on a single-flash control connected with only the master SB in the following.

At the completion of a diaphragm stop-down by input of a release signal, the gain setting of the flash photometry part 33 (Gain Setting 1) is performed. Then, after two small void light emissions for warming-up of the flash emitting part 17 and flash photometry part 33, the IS terminal is brought down to the low level to initiate an integration (Integration 1), and a preliminary light emission at the same time.

When the photometry-integrated value reaches an appropriate level or when the number of the small light emissions reaches a maximum number (e.g., 16 or so), the preliminary light emission is terminated. Then, after the integrated value (Reading 1) is read, the IS terminal is brought up to the high level to reset the integrated value. The integrated value during the preliminary light emission includes a fixed-light component in addition to the reflected light component of the SB light. Therefore, after the termination of the preliminary light emission, only the fixed light is integrated, and in a subsequent arithmetic processing, the fixed-light component is subtracted from the integrated value of the preliminary light emission.

In a Gain Setting 2, a gain for the fixed-light integration is set, and thereafter, the IS terminal is brought down to the low level to perform an integration of the fixed light (Integration 2) as the preliminary light emission. When the fixed-light integration is terminated, the integrated value is read (Reading 2), and the IS terminal is then brought up to the high level to reset the integrated value. Thereafter, the amount of a main light emission is calculated by an algorithm, which will be described later and the calculated amount is transmitted to the flash emitting part 17 via the SB microcomputer 51, whereby the main light emission is controlled at the time of photographing, and the photographing is completed.

Figure 9:
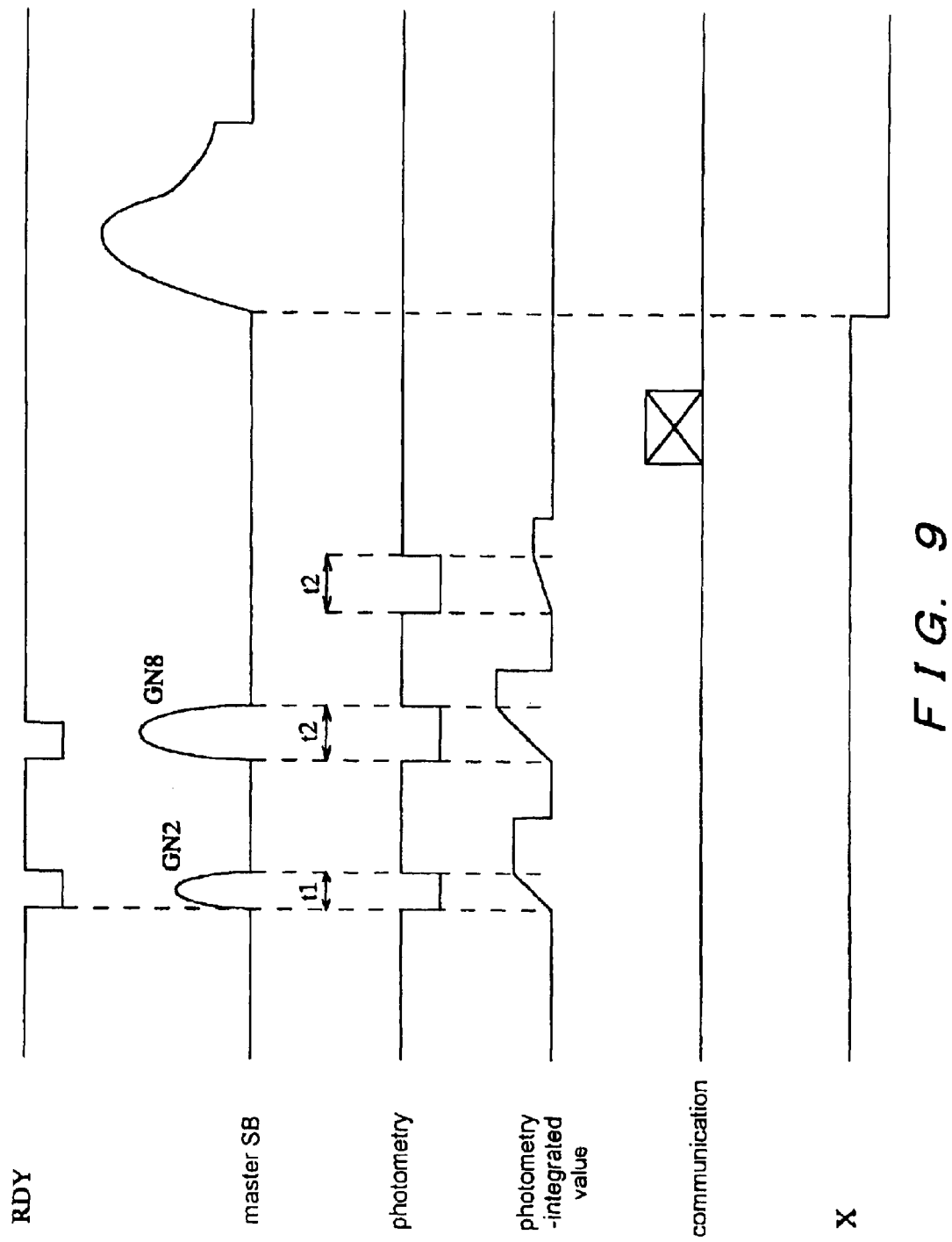
FIG. 9 is a timing chart for simply explaining the basic operations during a release in a case of a wireless control.

FIG. 9 is a timing chart for concise explanation of the basic operations at the release under a wireless control. Also for simpler explanation, description will be made on a case where only the master SB is connected. When a release signal is inputted, the flash emitting part 17 firstly emits preliminary light of guide number (which will be referred to as "GN") 2 or so. In synchronism with this light emission, the fixed-light photometry part 32 photometers reflected light. Thereafter, it is determined whether the photometry value has reached an effective level or not. If not, a preliminary light emission of GN 8 or so is performed again. In synchronism with this light emission, the fixed-light photometry part 32 photometers a reflected light.

As in the case of the single-flash control, the integrated value during the preliminary light emission includes a fixed-light component in addition to the reflected light component of the SB light. Therefore, after the termination of the preliminary light emission, only the fixed light is integrated, and in a subsequent arithmetic processing, the fixed-light component is subtracted from the integrated value of the preliminary light emission. Thereafter, the amount of a main light emission is calculated by an algorithm which will be described later, and the calculated amount is transmitted to the flash emitting part 17 via the SB microcomputer 51, whereby the main light emission is controlled at the time of photographing, and the photographing is completed.

Figure 10:
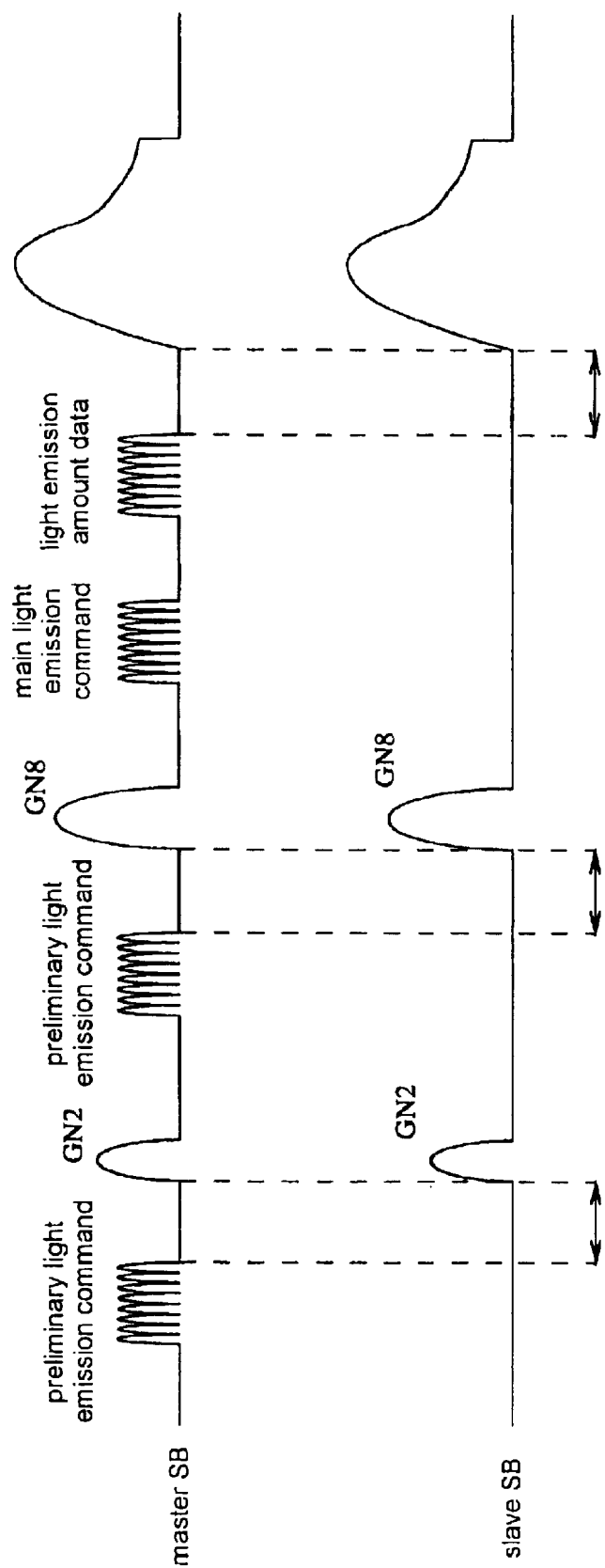
FIG. 10 is a timing chart for a case where a single slave SB is added to the master SB.

It should be noted that in the timing charts of FIG. 10 and of the following drawings, the description on the fixed-light integration operation will be omitted for simplicity.

In the multi-flash control of the present embodiment, the number of slave SBs is in principle increasable to any number. The SBs may be grouped into three groups A, B and C at maximum, and SBs belonging to the same group operate in the same manner. Which slave SB belongs to which group may be determined by operating a switch provided in the body of the slave SB. On the other hand, it is assumed that the master SB has to belong to the group A. It is also assumed that the dimmer correction amount and the like can be set for each group and that such settings are made by the data setting part 53 provided in the master SB.

FIG. 10 is a diagram simply showing a timing chart for a case where a single slave SB 60 is used in addition to the master SB 50. FIG. 10 shows an example in which the master SB 50 and slave SB 60 both belong to the group A. They are represented by master (A) and slave (A), respectively.

For controlling the slave SB 60, the master SB 50 repeatedly emits light of small amount (will be referred to as "chop light emission" hereinafter), thereby producing a coded optical signal to provide information to the slave SB 60. The slave SB 60 receives this coded optical signal at the light receiving part 21 to recognize receipt of a light emission command (will be referred to as "preliminary light emission command" hereinafter). When the light receiving part 21 receives subsequent light emitted by the master SB 50, the slave SB 60 emits first preliminary light in synchronism with the first preliminary light emission of the master SB 50.

In the present embodiment, as described in FIG. 9, the first preliminary light is emitted with a light amount of GN 2, and if the light amount is insufficient, the second preliminary light is emitted with a light mount of GN 8. It should be noted that in the present embodiment, the main light is always emitted after the second preliminary light emission. Before emitting the main light, the master SB 50 transmits an optical signal, which varies depending on the number of the SB groups. The example as shown in FIG. 10 has only one group, and hence performs communication of two bytes, the first byte representing a command indicating that the contents of data is of main light emission (which will be referred to as "main light emission command" hereinafter), and the second byte representing data of actual main light emission amount.

The optical signal will now be described below in greater detail.

FIG. 13 is a diagram for explaining the pulses of the optical signal and their functioning. It should be noted that the data at the preliminary light emission (the preliminary light emission command) is in the same format as the first byte of data at the main light emission (the main light emission command).

In the present embodiment, the optical signal consists of one byte or eight bits, each bit being defined such that it is represented by "1" if a chop light emission occurs, while it is presented by "0" if no chop light emission occurs.

The leading bit represents the occurrence of a chop light emission, because with no emission, it will be impossible to determine the timing. The following two bits designate the level of the guide number (0–3). These two bits designate different information, in accordance with whether they are of the optical signal following the main light emission command or they are of a command for the preliminary light emission (the preliminary light emission command). For the preliminary light emission, they designate the guide number of the preliminary light emission (See a step S205 of FIG. 15 described later). For the optical signal following the main light emission command, this two-bit data is determined as void data.

The next following two bits are used for a group designation (A, B, C, and ALL). The further next following one bit called "mode" indicate whether the optical signal is the main light emission command or the preliminary light emission command. Since the slave SBs receive a command rather abruptly, indicating here what command it is helps the slave SBs to discriminate the command contents. The last two bits designate channels (CH 0–3). This CH designation is performed for preventing malfunction by designating different channels when, for example, two photographers have the same sets and use them at close positions.

In FIG. 9, data on the main light emission amount following the main light emission command is added by pulsing KGNA (eight-bit data) that will be described later. It should be noted that the data format is common to the groups A through C.

Figure 11:
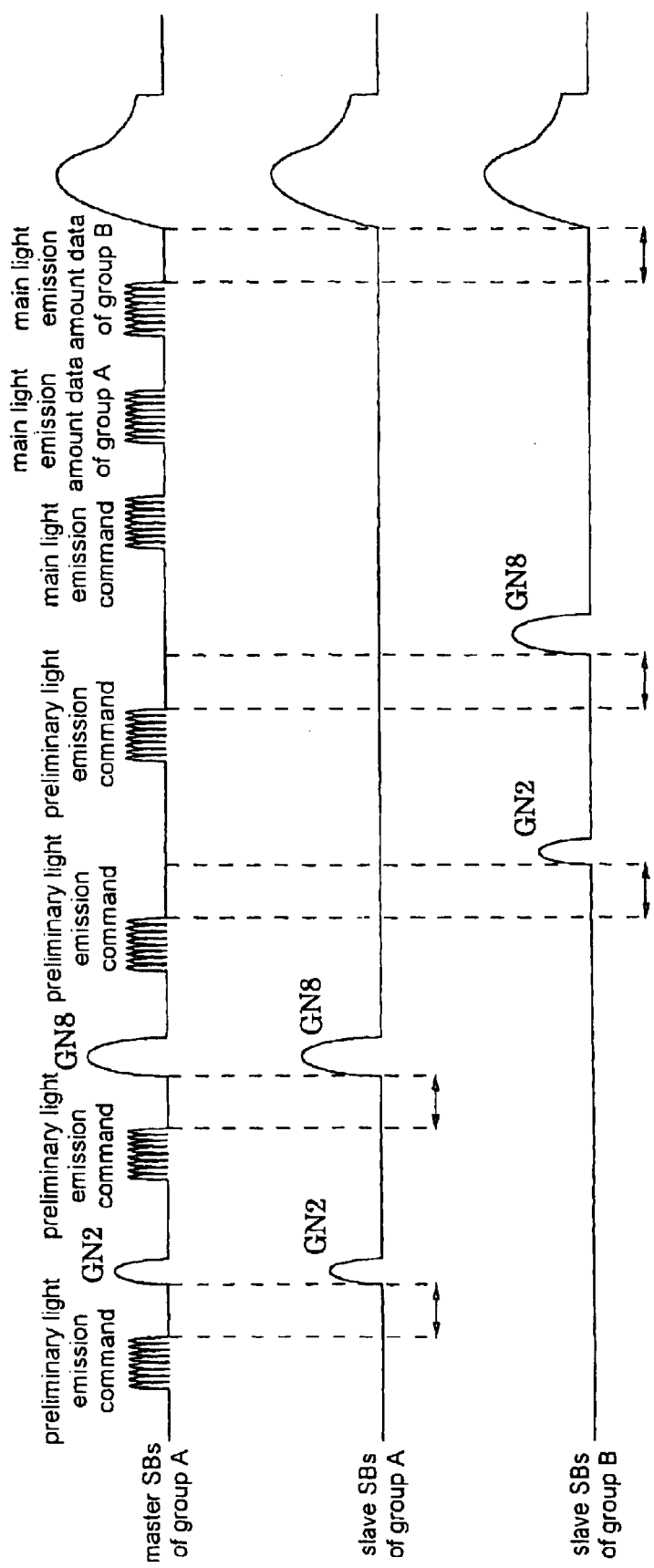
FIG. 11 is a timing chart for a case where two slave SBs are added to the master SB and there exist two groups A and B.
Figure 12:
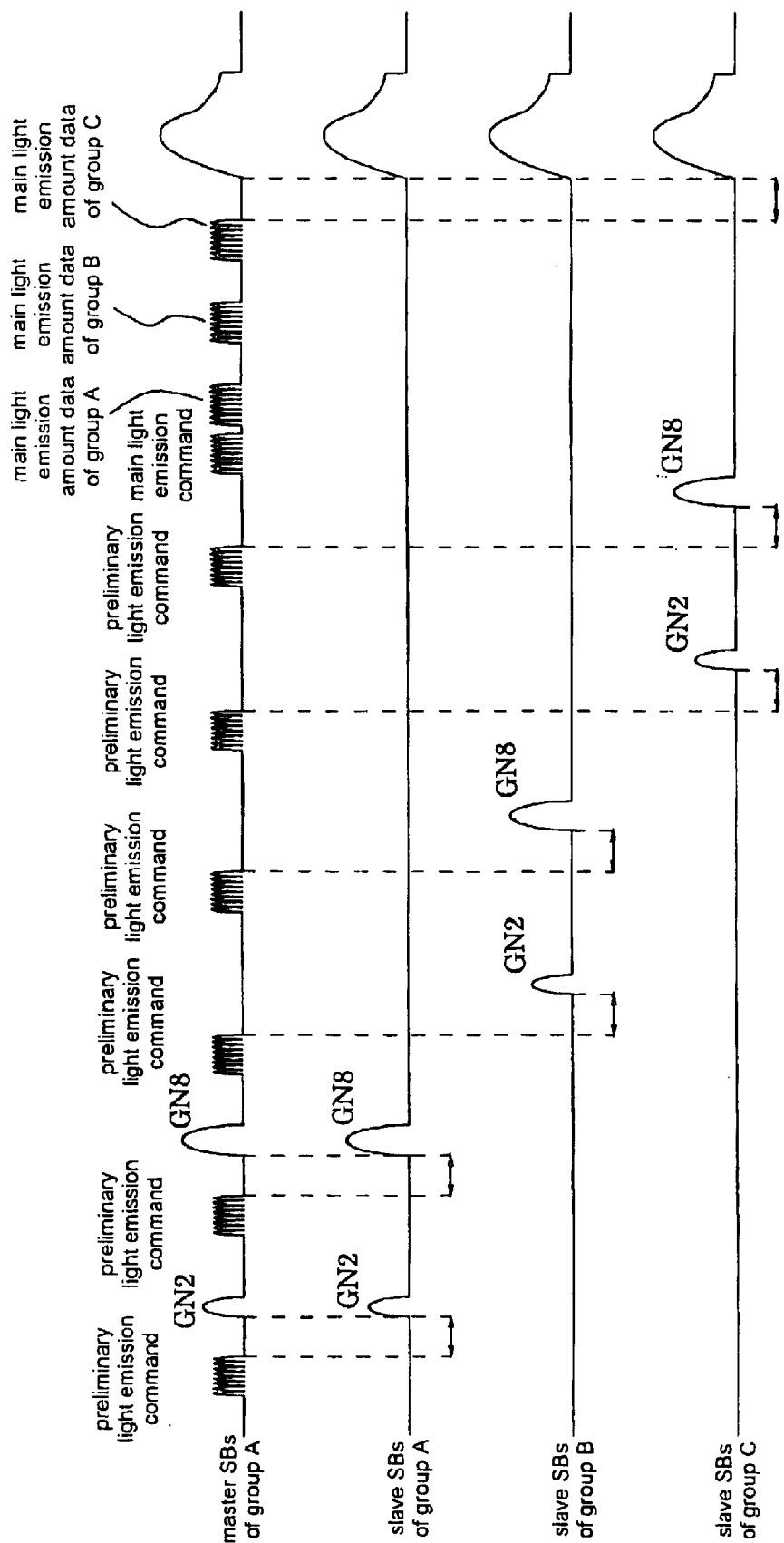
FIG. 12 is a timing chart for a case where three slave SBs are added to the master SB and there exist three groups A, B and C.

The example as shown in FIG. 10 had one group. Next, examples each having a plurality of groups will be described below. FIG. 11 is a diagram simply showing a timing chart where two slave SBs 60 are used in addition to the master SB 50 and there exist two groups A and B. FIG. 12 is a diagram simply showing a timing chart where three slave SBs 60 are used in addition to the master SB 50 and there exist three groups A, B and C.

In the case of the two groups, successive two bytes of optical signals follow a main light emission command, while in the case of the three groups, successive three bytes of optical signals follow a main light emission command. Each slave SB knows to which group it belongs. Therefore, for example, a slave SB belonging to the group A recognizes that the first byte following the main light emission command is data on the light emission amount directed to itself. A slave SB belonging to the group B recognizes that the second data following the main light emission command is data on the light emission amount directed to itself. A slave SB belonging to the group C recognizes that the third data following the main light emission command is data on the light emission amount data directed to itself.

The maximum bit number of the optical signals used for optical communication is five bytes (40 pulses) in FIG. 10, nine bytes (72 pulses) in FIG. 11, and thirteen bytes (104 pulses) in FIG. 12. If the light emission amount per chop light emission is set to GN2, and if all the light emissions of 104 pulses are performed, the total light emission amount of the optical signals (GN) used for the communication will be defined as follows:

$$2\sqrt{2} \times \sqrt{(104)} = 20.4$$

The GN 20.4 is an amount equivalent to a full light emission for a relatively small SB. Therefore, if extremely large amount of power is used for the optical signals, the remaining power available for illumination will be too small, resulting in insufficient illumination.

It should be noted that FIGS. 10 through 12 show as if the optical signals represented light emissions in all the bits, but actually, the optical signals each are composed of a combination of bits where light emissions occur and bits where no light emissions occur. Accordingly, in many cases, the actual total light emission amount will be less than the above-calculated value.

Figure 14:
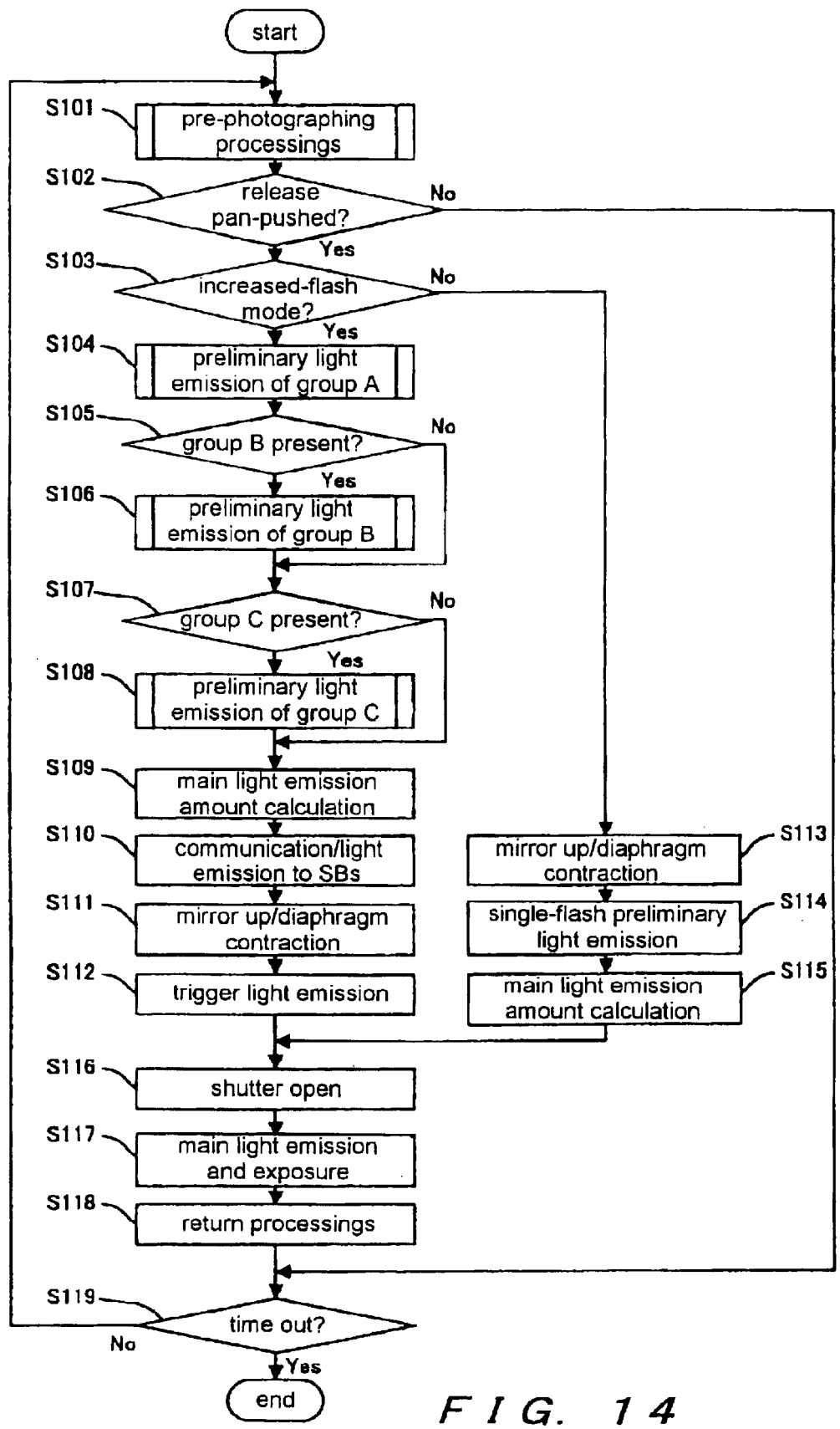
FIG. 14 is a flowchart showing a program of a camera microcomputer.

FIG. 14 is a flowchart describing a programming of the camera microcomputer 31. When the release switch 35 of the camera is half-pressed, the camera powers on, executing the program. Each step of the program will be described below.

In a step S101, pre-photographing processings of camera are performed. Their detailed descriptions will be made later. In a step S102, it is determined whether the release has been fully pressed or not. With the release fully pressed, the program proceeds to a step S103. With the release not fully pressed, the program proceeds to a step S119.

In the step S103, it is determined whether or not the camera is in an increased-flash mode. If the camera is in the increased-flash mode, the program proceeds to a step S104. Otherwise, the program proceeds to a step S113.

In the step S104, the group A emits the preliminary light, which will be described in detail later. In a step S105, it is determined whether or not a group B has been established. If the group B exists, the program proceeds to a step S106. Otherwise, the program proceeds to a step S107. In the step S106, the group B emits the preliminary light which will be described in detail later. In the step S107, it is determined whether or not a group C has been established. If the group C exists, the program proceeds to a step S108. Otherwise, the program proceeds to a step S109. In the step S108, the group C emits the preliminary light emission, which will be described in detail later. In the step S109, a main light emission amount is calculated. This calculation of the main light emission amount will be described below in detail.

First of all, description on the group A will be made.

First, GV[i] indicated below is obtained, where i is one of integers 1 through 5, which correspond to B1 through B5 of FIG. 3. GV[i] is a value obtained by converting a guide number, which gives a reference exposure amount to a subject of a standard reflectivity, into the unit EV. That is, GV[i] is obtained by the following equation (1).

$$GV[i]=\text{Log}2(GNpreA^2)+\log2(AD0[i]/AD[i])+(AV-AV0) \quad (1)$$

where: GNpreA is a guide number for a preliminary light emission;

AD0[i] is a photometry value of each area B[i] (an average in the area), i being 1 through 5, during an appropriate light amount;

AD[i] is a photometry value of each area B[i] (an average in the area), i being 1 through 5, during a preliminary light emission in which value a fixed-light value has been subtracted;

AV is a controlled diaphragm stop value (APEX value); and

AV0 is an open F value (APEX value).

Next, the GV[i] of each region is used to calculate the reflectivity of the subject RefEV[i] in that region by use of the following equation (2).

$$RefEV[i]=2*X+AV-GV[i] \quad (2)$$

where i is 1 through 5;

X is a photographing distance (in the unit m);

AV is a photographing diaphragm stop value (in the unit AV); and

RefEV[i] is a variable, which is "0" if the reflectivity is a standard value, and which is "+1" if the reflectivity is higher by one stage than the standard value, and which is "−1" if the reflectivity is lower by one stage than the standard value.

Next, RefEV[i] is used to calculate a weight number RefG[i] for each region in accordance with the reflectivity by use of the following equation (3).

$$RefG[i]=1/(2\square(Abs(RefEV[i]))) \quad (3)$$

where i is 1 through 5; and

Abs( ) is a function for obtaining the absolute value of a parenthesized value.

Figure 17:
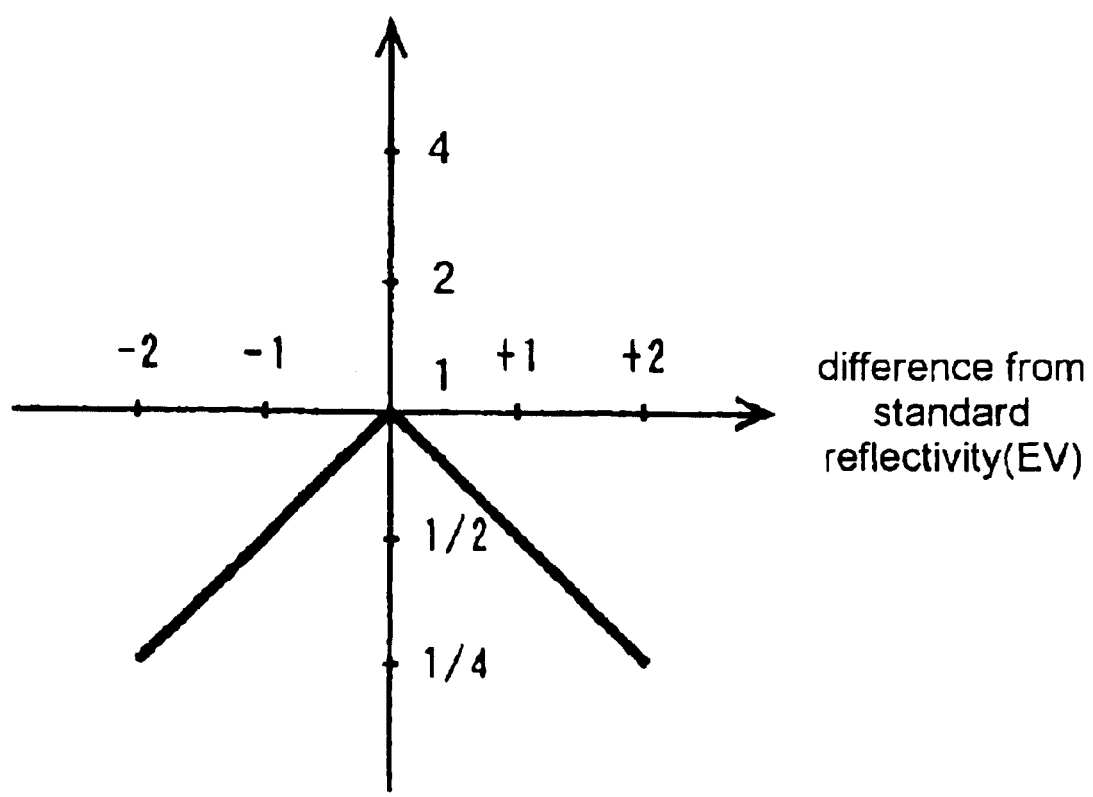
FIG. 17 is a diagram showing the relationship between a difference from a standard reflectivity and RefG[i].

FIG. 17 is a diagram showing the relationship between the difference from the standard reflectivity and the RefG[i].

As shown in FIG. 17, the RefG[i] is a variable, which is 1 if the reflectivity of the subject is the standard value and which becomes smaller as the reflectivity of the subject gets away from the standard value.

Next, the following equation (4) is used to normalize the RefG[i] and calculate a weight wt[i] for each region.

$$wt[i]=RefG[i]/\Sigma(RefG[i]) \quad (4)$$

where i is 1 through 5; and

Σ( ) is a function for obtaining the total sum of the variable RefG[i].

Next, RefEV[i] obtained by the equation (2) is again used to calculate a reflectivity correction value RefMain for the whole subject field by use of the following equation (5).

$$RefMain=\log2(\Sigma(wt[i]*2\square RefEV[i])) \quad (5)$$

where: i is 1 through 5;

Σ ( ) is a similar function to the equation (4); and log 2 is a function expressing the logarithm of 2.

Here, RefMain is used to calculate a main light emission amount correction value delta Y by use of the following equation (6).

$$\text{delta } Y=krm*RefMain \quad (6)$$

Figure 18:
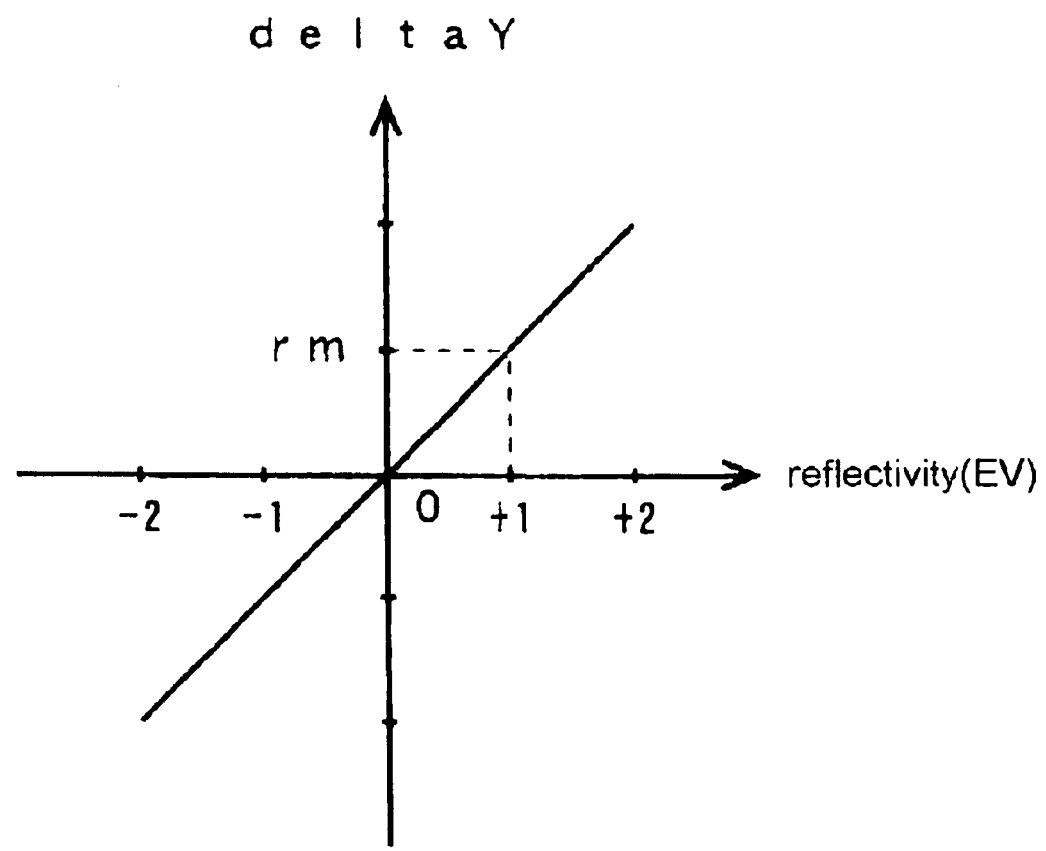
FIG. 18 is a diagram showing the relationship between the reflectivity and delta Y.

FIG. 18 is a diagram showing the relationship between the reflectivity and the delta Y. Here, "krm" is a constant for adjusting the degree of the reflectivity correction, and krm= 0.5 or so is used but may be replaced by another value if necessary.

When wt[i] and delta Y have been obtained by the equations (4) and (6), the following equations (7) and (8) are used to obtain a main light emission amount multiple K and calculate a main light emission amount multiple data KGNA.

$$K=\Sigma(2^{\hat{}}(GV[i])*wt[i])/(GNpre^2) \quad (7)$$

$$KGNA=12*(\log2(K))+\text{delta } Y)+128 \quad (8)$$

Figure 19:
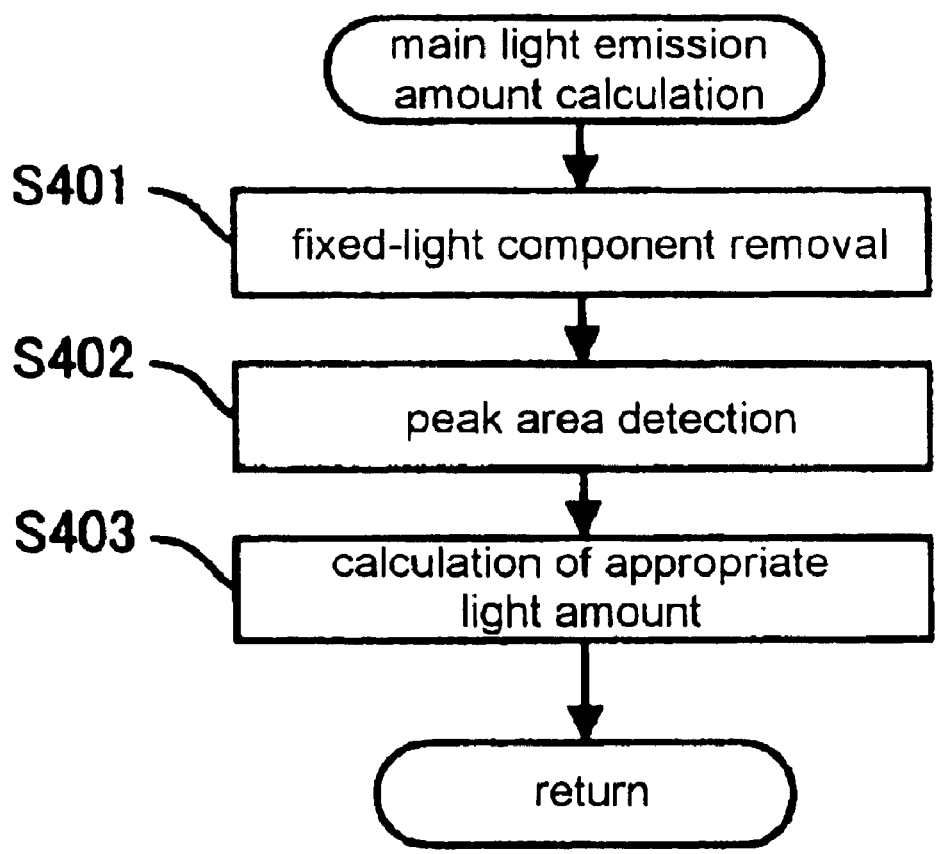
FIG. 19 is a diagram showing the procedure of calculation of the main light emission amounts in the groups B and C.

FIG. 19 is a diagram showing the procedure of the calculation of the main light emission amounts in the groups B and C.

Firstly, a photometry value excluding the fixed-light component is obtained for each area of B1 through B5 of FIG. 3 (Step S401). Next, according to the photometry values of each of the groups B and C, a peak area with the highest brightness is selected from the subject areas (Step S402). In views of the features of the increased-flash photographing it is desirable that the calculation is made for the groups B and C such that the brightest portion of the subject has a proper value.

FIG. 22 is a diagram simply showing a state of an increased-flash photographing.

In the state as shown in FIG. 22, the groups A through C illuminate parts 75, 76 and 77 of the subject, and the SBs of each group illuminate only respective parts of the subject. In many cases, each slave SB illuminates not the entire subject field but a particular part thereof, so that it is not certain that the whole image is illuminated. Therefore, setting the brightest area to have a proper value can determine an optimum exposure value. In a step S403, in order to provide an appropriate light amount for the peak area, the following equations (9) and (10) are used to calculate a main light emission amount multiple data KGNBC.

$$GVBC=\text{Log}2(GNpreBC^2)+\log2(AD0BC/ADBC)+(AV-AV0) \quad (9)$$

where: GNpreBC is a guide number during a preliminary light emission of each group;

AD0BC is a photometry value during an appropriate light amount;

ADBC is a photometry peak value (the highest value in all the areas) during a preliminary light emission in which value a fixed-light value has been subtracted;

AV is a controlled diaphragm stop value (APEX value); and

AV0 is an open F value (APEX value).

$$KGNBC=12*(GVBC-\text{Log2}(GNpreBC\hat{\ }2)/2)+128 \quad (10)$$

Referring back to FIG. 14, in a step S110, communication to each SB are performed and light is emitted.

In a step S111, a mirror-up operation and a diaphragm stop-down are performed. In a step S112, a main light emission trigger signal is emitted.

Steps S113 through S115 are operations for a single-flash. A mirror-up operation and a diaphragm stop-down (S113), a single-flash preliminary light emission (S114), and a main light emission amount calculation (S115) are performed.

In a step S116, the shutter is opened. If necessary, time taken from the shutter opening to the main light emission is measured so as to align the timing.

In a step S117, the X-contact is closed to perform a main light emission, and at the same time, an exposure to the imaging sensor 12 is performed.

In a step S118, the shutter, diaphragm and mirror return to their respective initial positions.

In a step S119, it is determined whether a predetermined time period has lapsed after the initiation of a half-press timer. If it is within the predetermined time period, the program goes back to the step S101 to repeat the processings. Otherwise, the program is ended.

Figure 15:
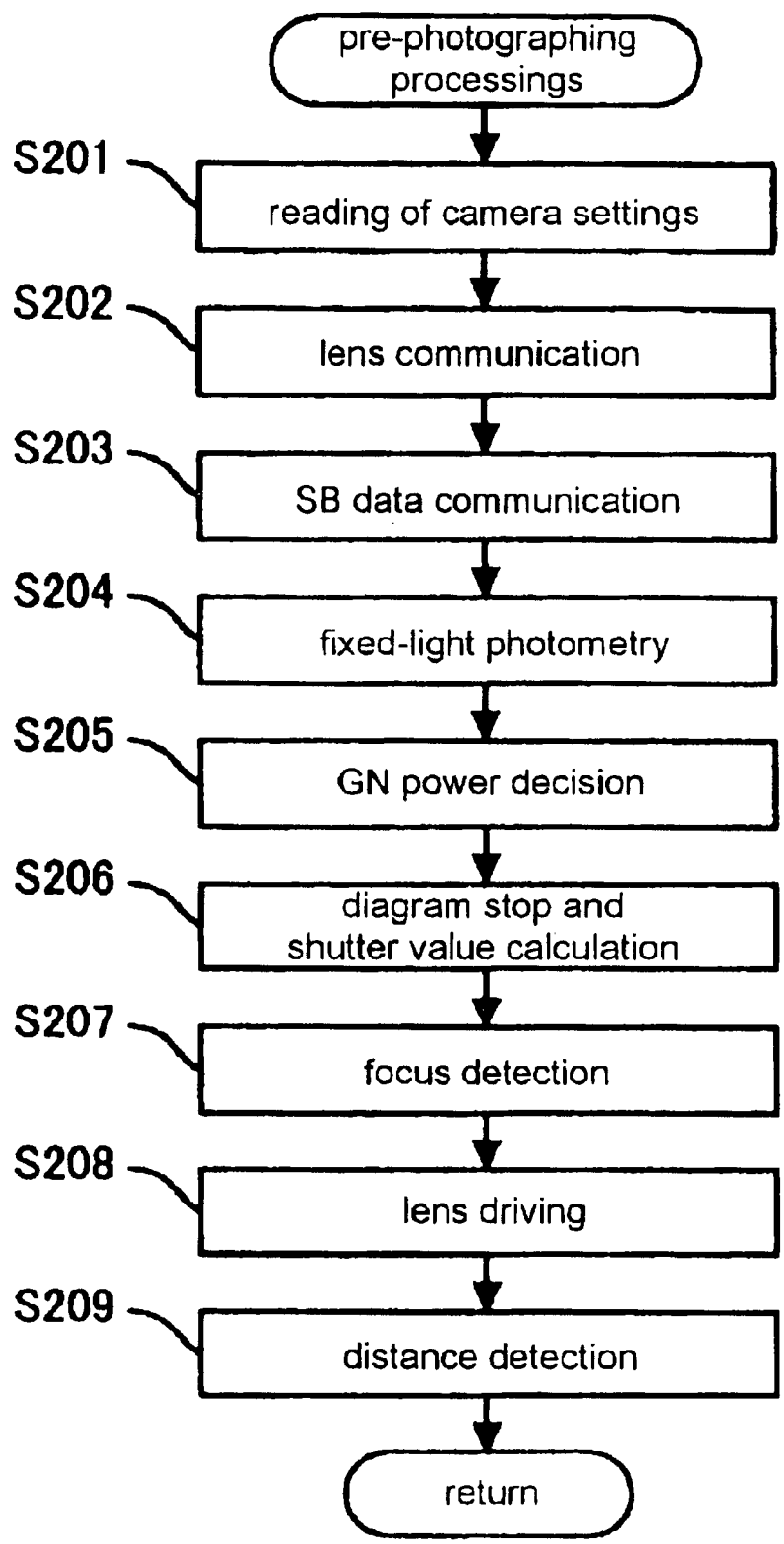
FIG. 15 is a subroutine flowchart diagram showing the control contents of the processings preceding a photographing.

FIG. 15 is a subroutine flowchart showing the controls of the processings prior to a photographing. When the step S101 of FIG. 14 is executed, the subroutine is invoked and executed.

Each step of the subroutine will now be described below.

In a step S201, camera settings (e.g., sensitivity, photometry mode, exposure mode, etc.) are read.

In a step S202, a lens focal distance, open F value, exit pupil distance, distance data and so on are read by lens communication.

In a step S203, SB communication is used to read a light amount per preliminary light emission of the master SB, a maximum main light emission amount, an SB state (whether SB is in a bounce state or not) and so on.

In a step S204, a fixed-light photometry is performed to calculate photometry values and the like of B1 through B5.

In a step S205, the guide number of a preliminary light emission and the guide number of an optical signal (the intensity of the optical signal) are designated.

As shown in FIG. 13, the guide number of the preliminary light emission can be designated to be any one of the four stages. The correspondences between two-bit signals designating the GN levels of FIG. 13 and GNs are as follows:

00 - - - preliminary light emission GN=2.0
01 - - - preliminary light emission GN=4.0
02 - - - preliminary light emission GN=5.6
03 - - - preliminary light emission GN=8.0

In a step 5206, an appropriate exposure value is calculated from the photometry values by using a known technique, and a diaphragm stop value and a shutter value are calculated in accordance with a set exposure mode.

In a step S207, a focus detection is performed.

In a step S208, the lens is driven until the defocus amount becomes zero in accordance with the detected state of the focus, thereby achieving a proper focus.

In a step S209, the focal distance of the lens at an in-focus position is regarded as a subject distance, and its value is read from the lens microcomputer 41.

Figure 16:
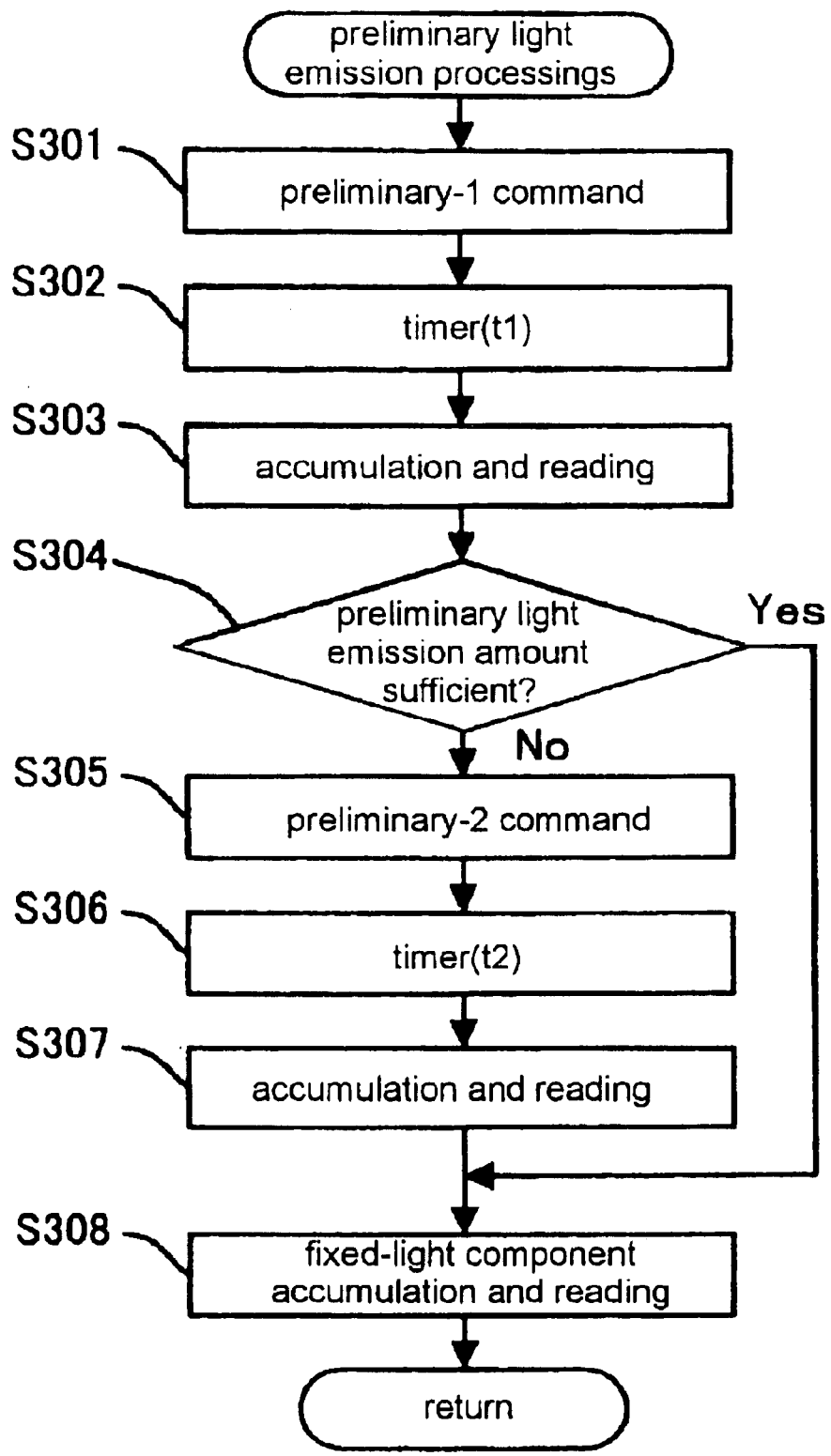
FIG. 16 is a diagram showing the processings of preliminary light emissions performed in steps S104, S106 and S108 of the main flowchart shown in FIG. 14.

FIG. 16 is a diagram showing the processings of the preliminary light emissions performed in the steps S104, S106 and S108 of the main flowchart shown in FIG. 14.

In a step S301, a preliminary light emission command is emitted which is an optical signal having information required for a preliminary light emission, at a first preliminary light emission. (This command will be referred to as "preliminary-1 command" hereinafter.) After emission of this preliminary-1 command, the RDY is decreased (See FIG. 9).

In a step S302, the timer is set for a predetermined time period t1 after decreasing the RDY.

In a step 5303, for the above time period t1 (for the first preliminary light emission), a reflected light is accumulated, and the accumulation data is read from the photometry element 9 to the camera microcomputer 31.

In a step S304, it is determined from the read accumulation data whether the light amount is sufficient or not. If the light amount is sufficient, the program proceeds to a step 5308. Otherwise, the program proceeds to a step S305.

In steps S305 through 5307, similar processings to those of the foregoing steps 301 through S303 are performed during a time period t2 as shown in FIG. 9 (the time period for a second preliminary light emission). It should be noted that the guide number of the second preliminary light emission is decided with reference to the accumulation data obtained from the first preliminary light emission.

In a step S308, an accumulation of the fixed-light component and a reading thereof are performed. It should be noted that even if the light amount of the second preliminary light emission is insufficient, the processings are continued according to the accumulation data obtained from the second preliminary light emission.

Figure 20:
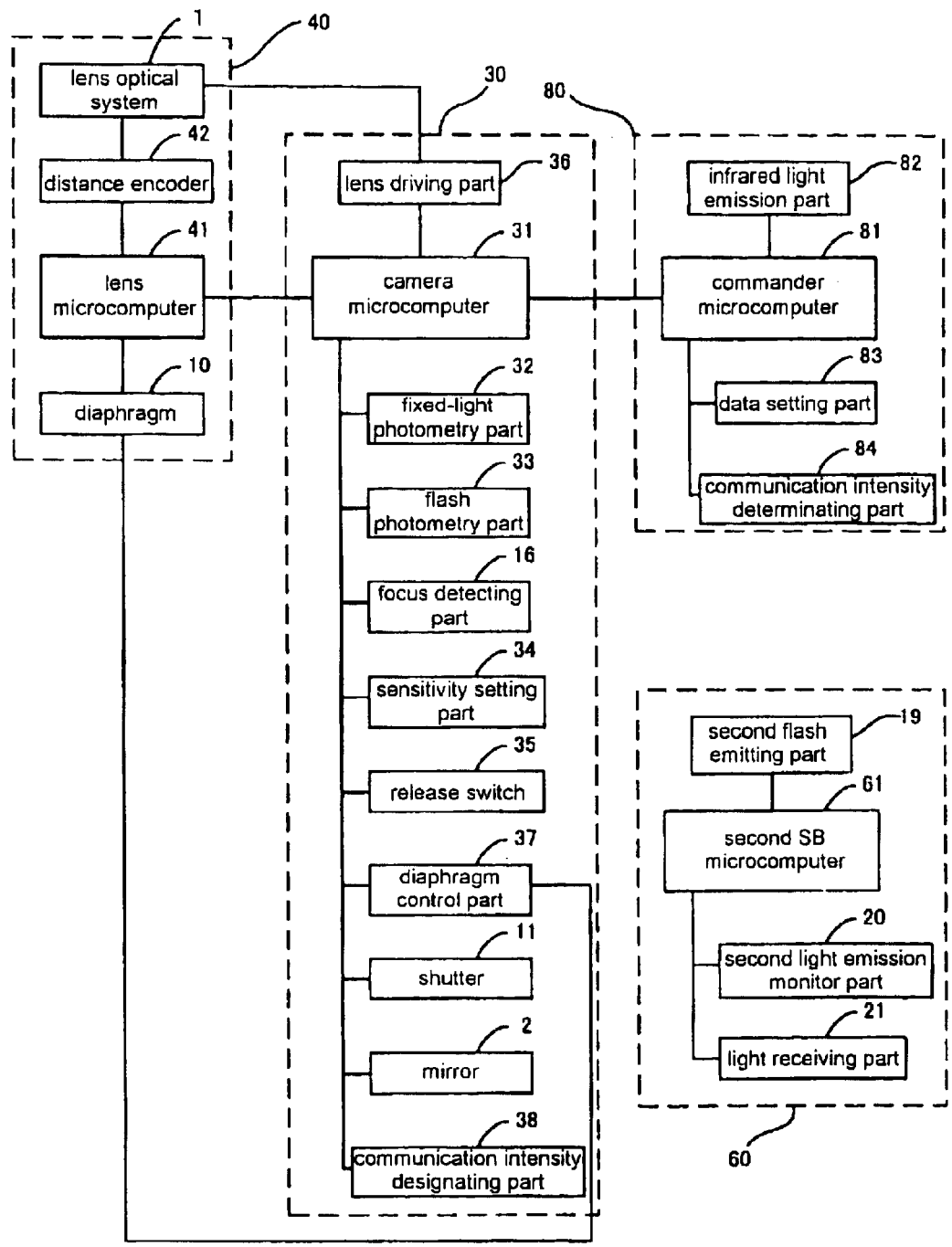
FIG. 20 is a block diagram showing a schematic structure in a case where a dedicated commander is provided in the present embodiment.

FIG. 20 is a block diagram showing a schematic structure in a case where a dedicated commander 80 is provided in the present embodiment.

The dedicated commander 80 is a dedicated signal emission device that can replace the master SB 50 as a light/signal emission device. The dedicated commander 80 includes a commander microcomputer 81, an infrared light emission part 82, a data setting part 83, a communication intensity determining part 84 and so on. The infrared light emission part 82 as a light emission part dedicated to communication is formed by attaching a visible-light blocking filter to the flash emitting part 17 of the master SB 50.

Figure 21:
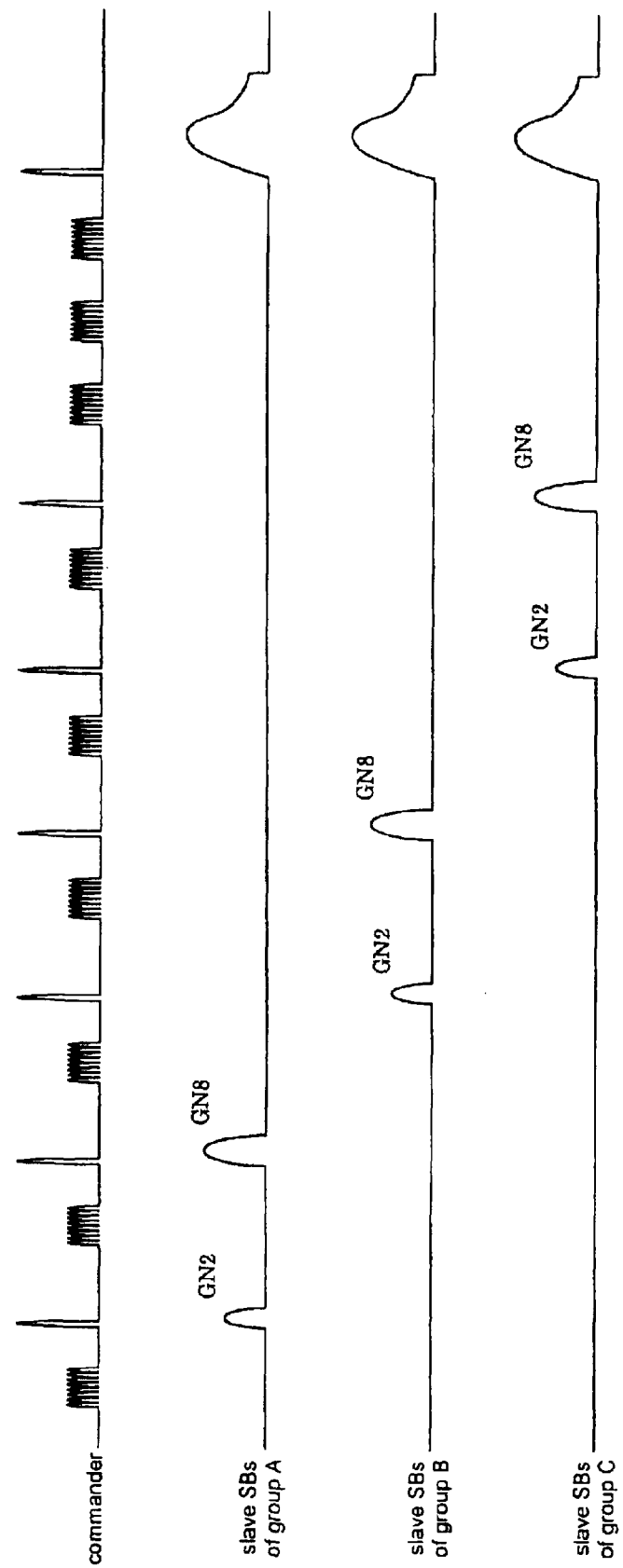
FIG. 21 is a timing chart for performing a multi-flash control of the slave SBs belonging to the three groups A through C by use of the dedicated commander.

FIG. 21 is a simple timing chart for performing a multi-flash control of the slave SBs of the three groups A through C by use of the dedicated commander 80.

The dedicated commander 80 does not emit any flash for illumination but instead emits chop light serving as a trigger after the emission of an optical signal, thereby transmitting the light emission timing to the slave SBs. Additionally, since it is not necessary to reserve power for emitting a flash as illumination, the optical signal can be emitted with higher light intensity as previously described. Besides, even when the master SB is connected, a similar timing chart to that of FIG. 21 can be realized in a commander mode where the master SB itself performs no main light emission.

FIG. 24 is a table showing the relationship between the setting conditions and the communication intensities.

The SB microcomputer 51 uses a detection result from the power supply detection part 52 and information on the communication intensity designating part 38 received from the camera microcomputer 31 via the data communication to instruct the communication intensity determining part 54 or 84 to determine the guide number of the optical signal (the light intensity) as shown in a column of "Communication Intensity Increase Not Designated" of FIG. 24. According to the present embodiment, the communication intensity designating part 38 and communication intensity determining part 54 or 84 function as a communication intensity deciding part for deciding the intensity of the optical signal.

In a case only the master SB is provided, a sufficient amount of power to be used for following light emission must be reserved, so that the communication intensity cannot be set to a very high value and hence is set to GN 0.7.

With the master SB plus the power pack, or even with only the master SB and the master SB emitting no main light, the communication intensity can be raised up to GN 1.0.

With the combination of the master SB plus the power pack and the master SB emitting no main light, or with the dedicated commander, the communication intensity can be further raised up and is set to GN 1.4.

The way of increasing communication intensity will be described later in a third embodiment.

According to the present embodiment, upon determining the state of the SB attached, the communication intensity designating part 38 and communication intensity determining part 54 or 84 decide the guide number of the optical signal (the light intensity). Therefore, with extra power available by the power pack attached, or with the use of the dedicated commander 80, the intensity of the optical signal can be increased, so that even if the slave SBs are at positions far from the camera, more secure communication therebetween can be made.

Second Embodiment

A second embodiment is the same as the first embodiment except that the communication intensity designating part 38 and communication intensity determining part 54 are partially different in operation. Therefore, descriptions on the portions of the second embodiment common to those of the first embodiment will be omitted as appropriate.

Figure 23:
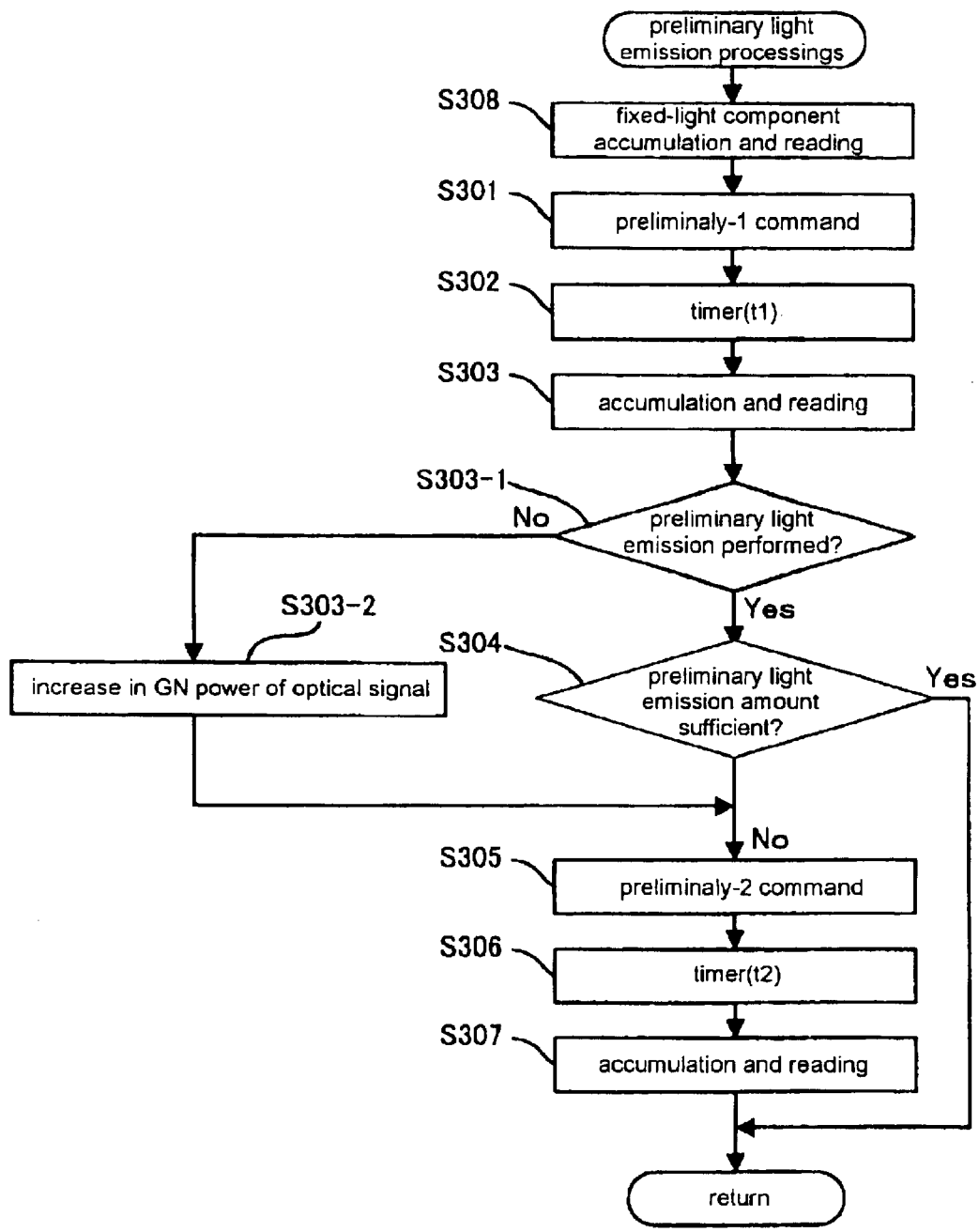
FIG. 23 is a diagram showing the processings of preliminary light emissions in a second embodiment.

FIG. 23 is a diagram showing the processings of preliminary light emissions in the second embodiment. The flowchart of FIG. 23 is different from that of FIG. 16 shown in the first embodiment only in that steps S303-1 and S303-2 are additionally provided and the step S308 comes first. Therefore, only the differences therein will be described below.

The reason why the photometry of fixed-light component of the step S308 is performed first is because a result of this photometry will be used in the following step S303-1 to determine whether preliminary light has been emitted.

In the step S303-1, the camera microcomputer 31 determines, from a difference between a result of the accumulation and reading in the step S303 and the fixed-light component in the step S308, whether a slave SB 60 has performed the preliminary light emission. That is, when the difference is equal to or less than a predetermined value, the camera microcomputer 31 determines that the preliminary light has not been emitted. Thus, in this step, the camera microcomputer 31 functions as a slave flash determining part. If the preliminary light has been emitted, the program proceeds to the step S304. Otherwise, the program proceeds to the step S303-2.

Since no preliminary light has been emitted at the time of proceeding to the step S303-2, it is probable that the optical signal of the preliminary-1 command has failed to reach the slave SB 60. Therefore, the optical signal of a preliminary-2 command emitted next is caused to reach the slave SB 60 without fail by increasing the GN power of the optical signal (the intensity of the optical signal). Specifically, the camera microcomputer 31 sets data on an intensity increase request to the communication intensity designating part 38 and transmits the data to the SB microcomputer 51. After setting an increase in the GN power of the optical signal in the present step, the program proceeds to the step S305.

According to the present embodiment, the intensity of the optical signal is increased after determining that preliminary light has not been emitted. Therefore, even in a case where the slave SB 60 and the master SB 50 is far from each other, more reliable communication are made therebetween.

Third Embodiment

A third embodiment is the same as the first embodiment except that the communication intensity designating part 38 is partially different in operation. Therefore, descriptions of the portions of the third embodiment that are common to those of the first embodiment will be omitted as appropriate.

The communication intensity designating part 38 further increases, based on the result of a photometry performed by the fixed-light photometry part 32, the foregoing guide number of the optical signal (the light intensity) in accordance with the brightness of the subject field.

In the present embodiment, the guide number of the optical signal (the light intensity) is increased in the following manner.

When the fixed light is lower than 12 EV (ISO 100), no communication intensity increase is requested. When the fixed light is equal to or higher than 12 EV (ISO 100), a communication intensity increase is requested. The guide number of the optical signal is changed as shown in FIG. 24, depending on whether the communication intensity increase request occurs or not. According to the present embodiment, the intensity of the optical signal is increased in accordance with the brightness of the fixed light. This prevents the slave SB 60 from failing detection of the optical signal in a case where the subject field is bright and the optical signal is hidden in the ambient light. Thus, a reliable communication can be made regardless of the brightness of the subject field.

Fourth Embodiment

Figure 25:
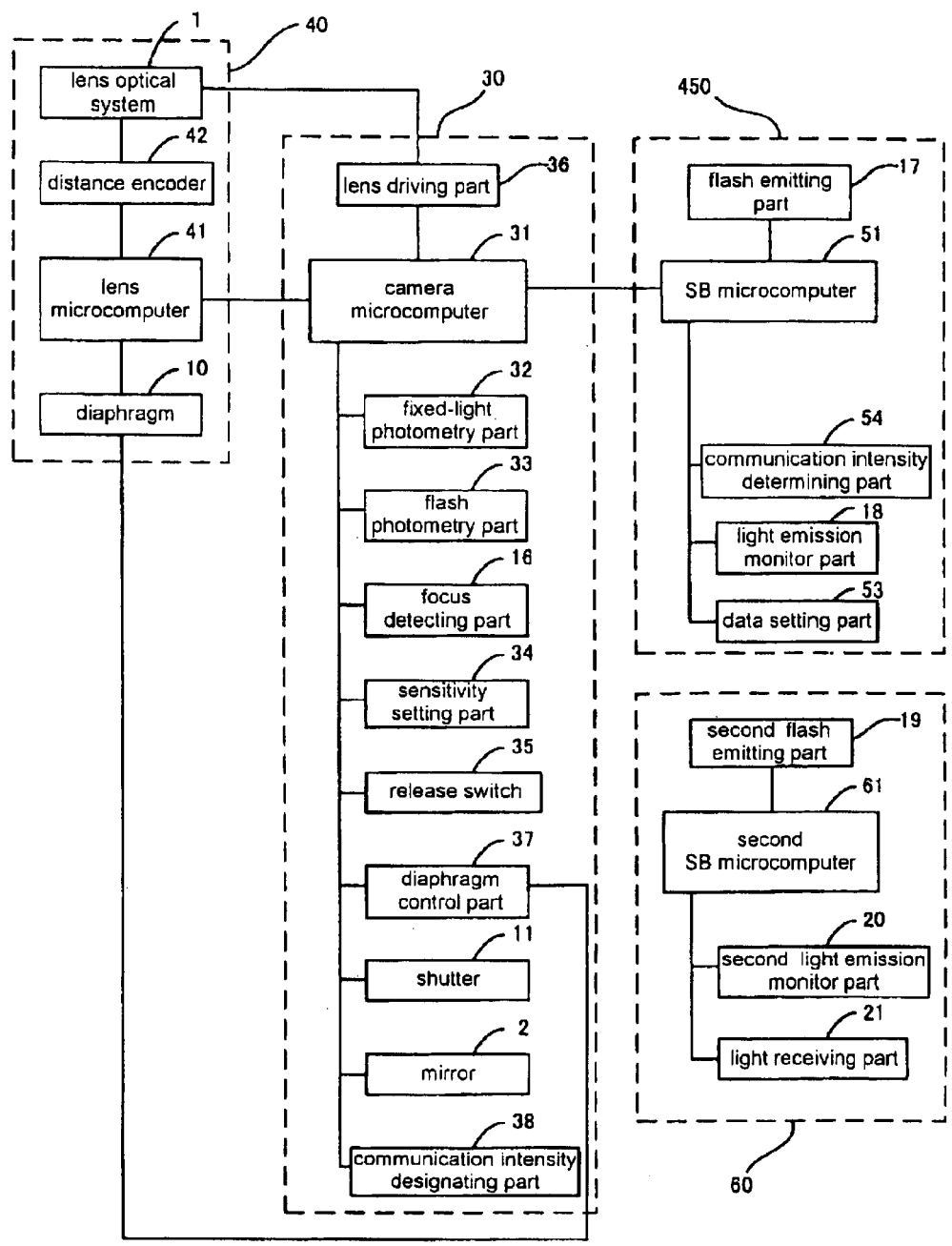
FIG. 25 is a block diagram showing a schematic structure of a fourth embodiment.

FIG. 25 is a block diagram showing a schematic structure of a fourth embodiment. Unlike the first through third embodiments, the fourth embodiment does not have a power supply detecting part, but power to be used for emitting the optical signal can be secured by photographer's selection of a photographing mode.

Figure 26:
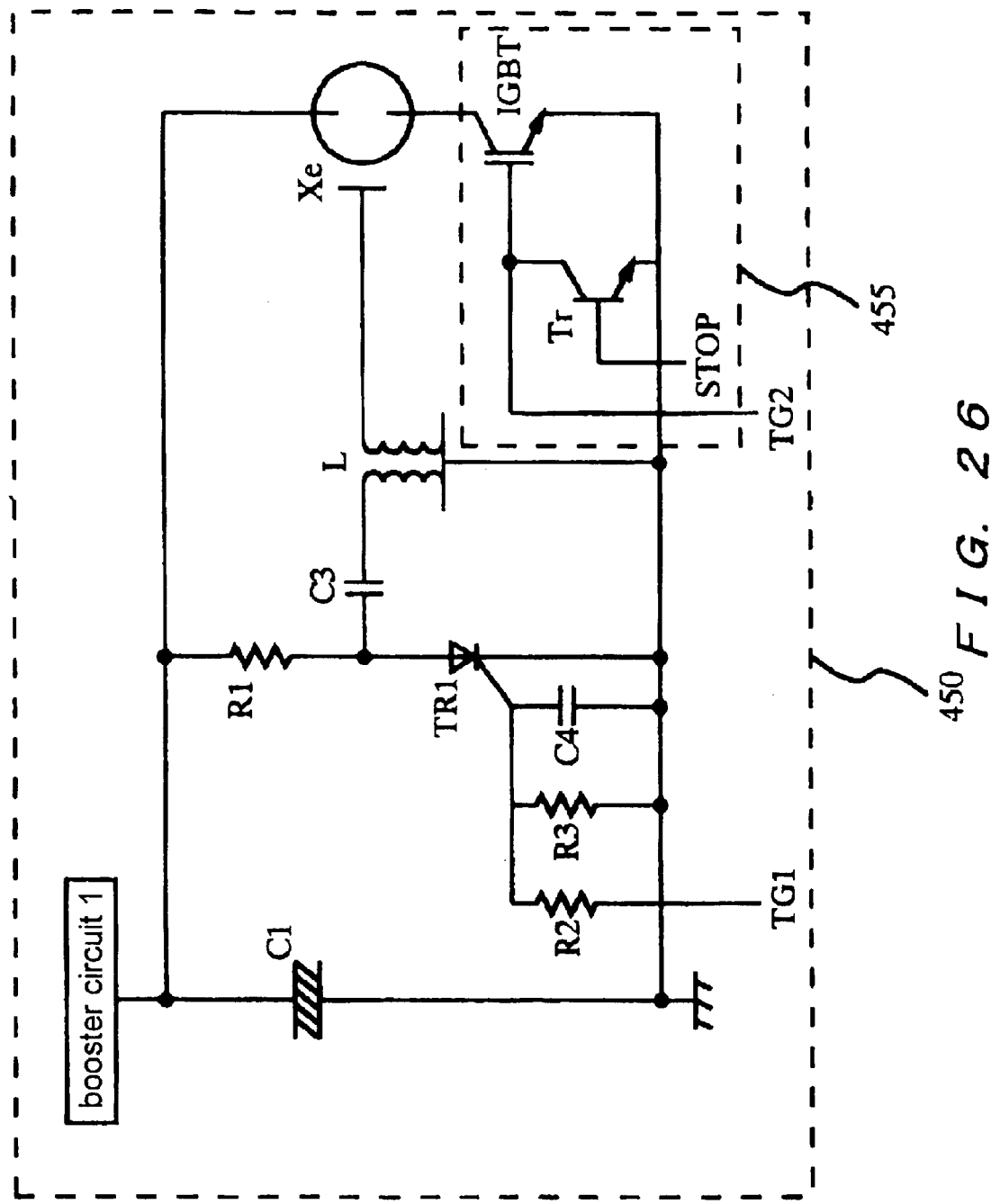
FIG. 26 is a diagram simply showing a circuit of the body of the master SB in the fourth embodiment.
Figure 27:
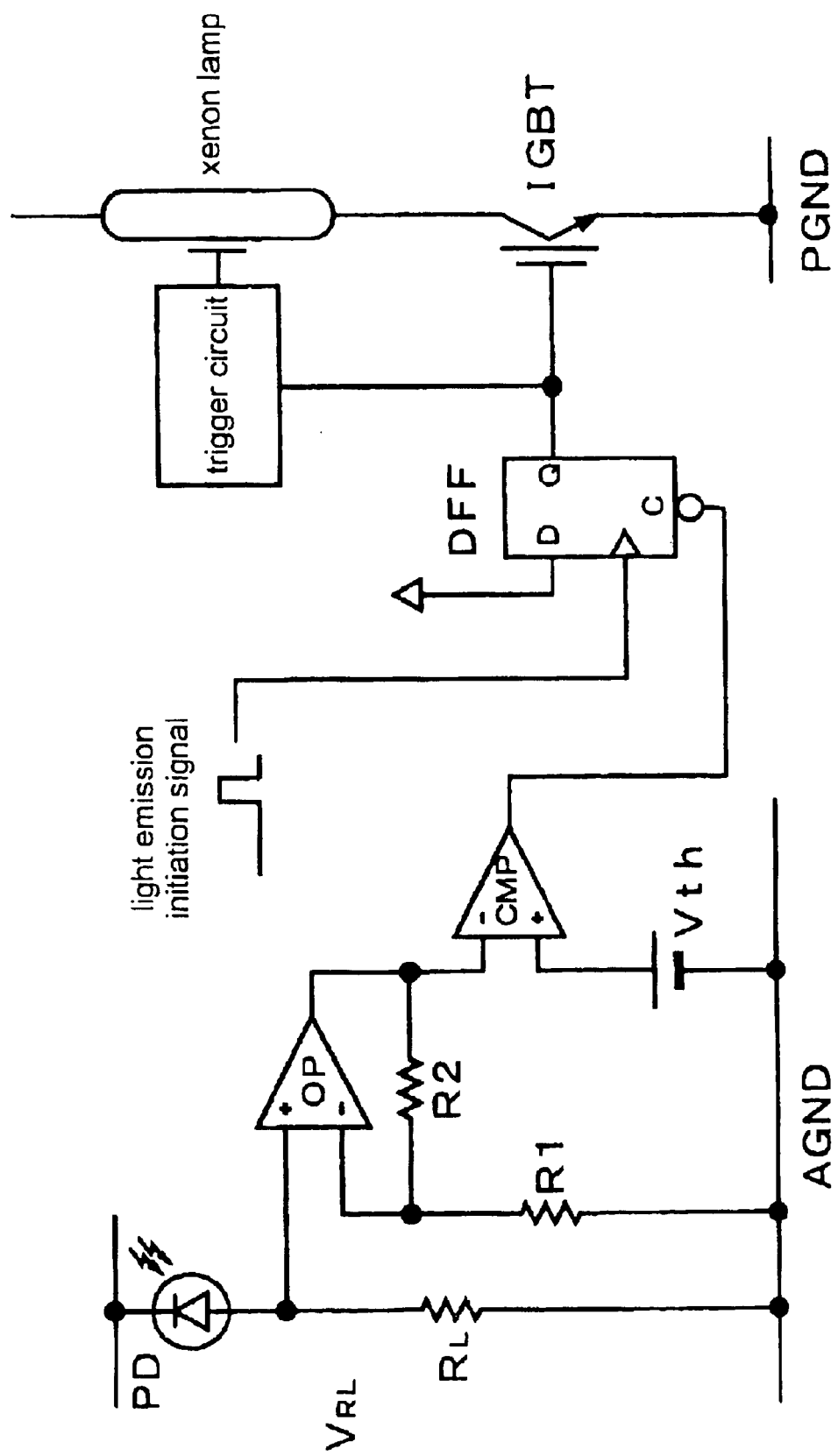
FIG. 27 is a diagram for explaining, in greater detail, a circuit that controls a small light emission of the optical signal in FIG. 25.
Figure 28:
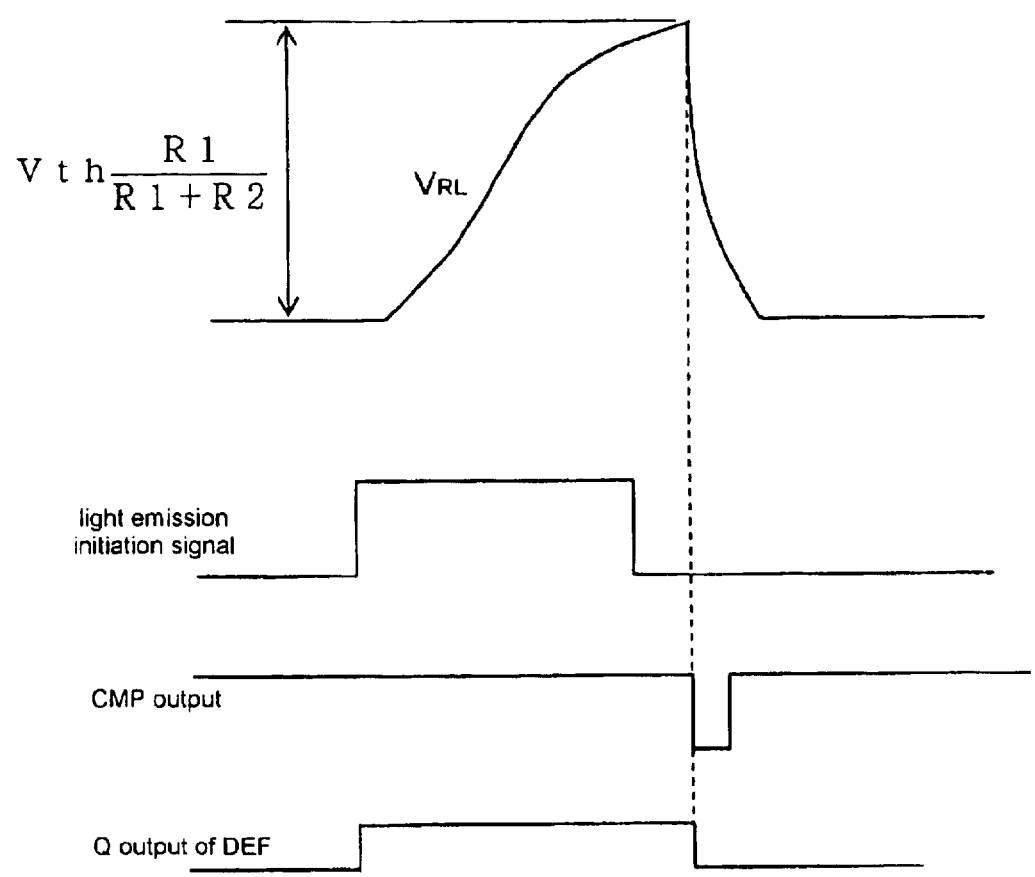
FIG. 28 is a diagram showing signal waveforms during a small light emission in the present embodiment.

FIG. 26 is a diagram simply showing a circuit of the body of the master SB 450 in the fourth embodiment. FIG. 27 is a diagram for explaining, in greater detail, a circuit 455 that controls a small light emission of the optical signal in FIG. 25. FIG. 28 is a diagram showing signal waveforms during a small light emission in the present embodiment.

A photodiode PD monitors a light emission of a xenon lamp, and its generated current is converted to a voltage by use of a resistor RL The current generated by the photodiode PD is proportional to the amount of a received light with high precision. An operational amplifier OP and resistors R1 and R2 constitute a voltage amplifier which amplifies the voltage generated at the resistor RL by multiplying this voltage by $(R1+R2)/R1$. Here, the voltage is not amplified at once by a resistor RL with a large value because the resistor RL having a large value causes a response delay due to a large junction capacitance of the photodiode PD.

The output of the operational amplifier OP is an amplified light emission monitor voltage, which is compared with a comparison voltage Vth by a comparator CMP. A light emission initiation signal as a positive pulse allows an output Q of a D-type flip-flop DFF to be high, thereby turning on an IGBT and activating a trigger circuit to generate a high voltage that causes the xenon lamp to emit light. Thus, the xenon lamp starts light emission by the light emission initiation signal. The power source of the xenon lamp is a main capacitor C1 charged beforehand to an accumulated charge of about 330 V or so. After the light emission is started, the photodiode PD generates an optical current. With an increase in the light emission amount, the comparator CMP provides a low output, thereby resetting the DFF and hence setting the output Q low. Therefore, the IGBT is turned off, and the light emission is stopped. An optical pulse train transmitting data to a slave SB is provided by repeating this small-light-emission control.

FIG. 29 shows examples of a screen display when the master SB 450 in the present embodiment is in a wireless multi-flash photographing mode. FIG. 29(a) shows a case of selecting a conventional wireless multi-flash photographing mode.

In a wireless photographing, it is possible to set a light emission control mode such as a TTL automatic dimmer mode or a manual light emission mode to each of the SBs.

In an automatic dimmer mode, such as the TTL automatic dimmer mode, it is possible to set a correction amount for a standard exposure level. In FIG. 29(a), the numerical values indicated on the right side of labels "TTL" show such correction amounts in expression of EV values.

Since the amount of light emission is set by the photographer in the manual light emission mode, not the correction amount but the absolute light emission amount is set. In FIG. 29(a), a label "MAN" indicates the manual light emission, and a label "GN30" on the right hand indicates a light emission amount (guide number). It should be noted that in the manual light emission mode, any preliminary light emission is not required. FIG. 29(a) shows a setting labeled "MASTER TTL", and hence this flash device functions as the master SB. In this case, the intensity of the optical signal (the pulse train) transmitting data to the slave SBs must be suppressed to a relatively small value as previously described.

FIG. 29(b) is a diagram showing a case of selecting a commander mode that is one of the wireless multi-flash photographing modes.

That is, the present embodiment includes, in addition to the wireless multi-flash photographing mode as in the conventional technique as shown in FIG. 29(a), a wireless multi-flash photographing mode referred to as "commander mode" as shown in FIG. 29(b). In this commander mode, similarly to the commander mode in the first embodiment, the master SB itself does not emit main light even when it is attached. The photographer sets a mode of the flash device directly connected to the camera to the wireless multi-flash photographing mode, and also sets this flash device not to emit main light itself, thereby realizing the settings as shown in FIG. 29(b).

A label "MASTER - - - " signifies that the flash device is set not to emit main light. This setting is transmitted to the camera by use of an electric communication via a terminal connected to the camera. Therefore, the camera recognizes that a photographing is performed with light from only the slave SBs (the commander mode), and performs a sequence control such that only the slave SBs (A, B, C) emit the preliminary light. It should be noted that the manner of controlling the light emissions is similar to that in the commander mode of the first embodiment, and that its timing chart is also similar to that as shown in FIG. 21.

In the present embodiment, the photographer sets the flash device directly connected to the camera to the wireless multi-flash photographing mode, and also sets the flash device not to emit light, thereby inhibiting the master SB from emitting the main light. However, for example, it may be configured that setting the wireless multi-flash photographing mode automatically inhibits the master SB from emitting the main light. Even in such a case it may be additionally configured that the master SB is not inhibited from emitting the main light when having sufficient light emission power capacity for the main light emission.

According to the present embodiment, the master SB emits pulse light only for data transmission or timing recognition and does not emit main light so that the intensity of the optical light can be increased. Therefore, it is able to properly control the slave flash devices even when the master SB and the slave SBs are far from each other, or they have to communicate with each other by the light emission pulses as reflected from a peripheral object or the like because surrounding environment obstructs lines of sight from the master SB to the slave SBs at the photographing.

Fifth Embodiment

Figure 30:
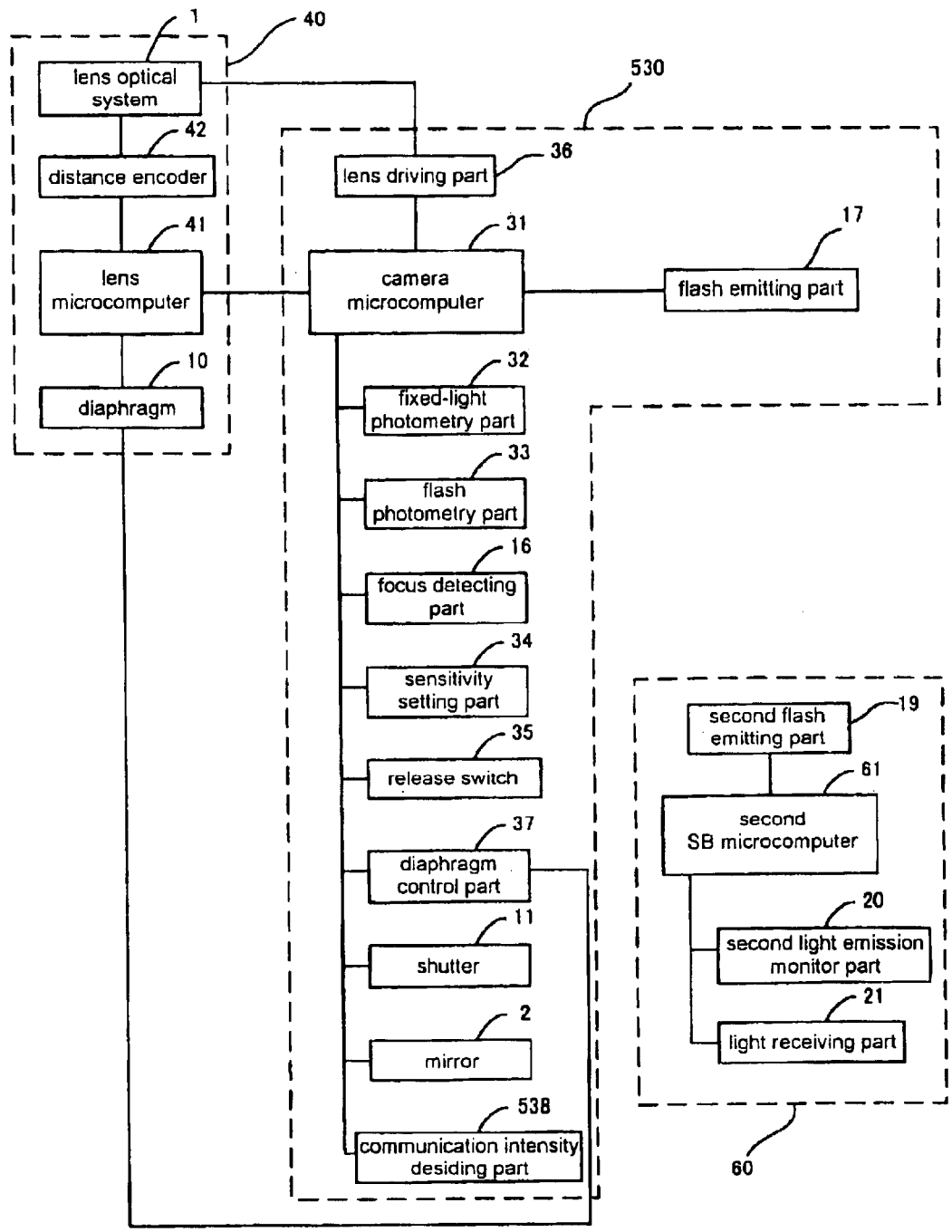
FIG. 30 is a block diagram showing a schematic structure of a fifth embodiment.

FIG. 30 is a block diagram showing a schematic structure of a fifth embodiment.

The fourth embodiment describes the case of using the master SB 450 being of a so-called external type detachable from the camera. The present embodiment is also applied to a case where a slave SB 60 is controlled by a flash emitting part 17 built in a camera body 530.

In general, a flash device built even in a so-called single-lens reflex (SLR) camera has small guide numbers and small light emission power. Therefore, if the flash emitting part 17 built in the camera emits an optical signal so as to control the slave SB 60, the power used for the main light emission may be in shortage in many cases, or if the power required for the main light emission is secured first, the power available for the communication may be in shortage, resulting in emitting the optical signal with insufficient intensity.

In view of solving these disadvantages, according to the present embodiment, in the case where the flash emitting part 17 built in the camera controls the slave SB 60; a communication intensity deciding part 538 inhibits the flash emitting part 17 from illuminating during photographing. Accordingly, when the present embodiment is applied to a wireless multi-flash system, the flash emitting part 17 built in the camera is able to control the slave SB 60 by outputting only light emission pulses for communication, or in other words functioning only in the commander mode.

In the present embodiment, since the flash emitting part 17 built in the camera controls the slave SB 60, the light emission intensity is smaller than that in the case of using the discrete master SB 450 as described in the fourth embodiment in the commander mode. According to the present embodiment, however, the photographer can shoot more freely than when using a conventional cable connection.

According to the present embodiment, a flash device built in a camera does not emit main light but outputs a control light pulse train to a slave SB, thereby enabling a wireless (multi-flash) photographing.

Modification of Embodiments

The present invention is not limited to the embodiments described above, and various modifications and changes are to be made within the scope of the present invention.

For instance, the first embodiment describes the example where the power supply detecting part 52 and SB microcomputer S1 determine whether the power pack is connected, and the intensity of the optical signal is changed in accordance with the result of the determination. The present invention, however, is not limited thereto. For example, it may be configured that the power supply detecting part 52 checks the state of the power supply of the master SB 50 (the charging state or the like).

The second embodiment describes the example where after the step S303-2 the program proceeds to the step S305 in which the preliminary-2 command is executed. The present invention is not limited thereto. For example, it may be configured that the program returns to the step S301 to execute the preliminary-1 command again.

The third embodiment describes the example where the intensity of the optical signal is changed in accordance with the result of the photometry of the fixed-light photometry part 32 provided in the camera body 30. The present invention is not limited thereto. For example, it may be configured that a fixed-light photometry part be also provided in the master SB 50 and that the master SB 50 itself perform the photometry by use of the fixed-light photometry part and change the intensity of the optical signal in accordance with the result of the photometry.

The foregoing embodiments describes as examples of an electronic still camera using an imaging sensor such as CCD or the like. The present invention, however, may be applied to a camera that exposes a silver film.

For ease of understanding, the advantages of the embodiments described above will be explained below in general expressions.

(1) The communication intensity deciding part is provided for deciding, based on a determination result of the power determination part, the intensity of the optical signal to be emitted by the signal emitting part. Therefore, the communication can be made by optical signals with an optimum intensity in accordance with an amount of available power. This also eliminates unnecessary consumption of power and enables secure communication.

(2) The communication intensity deciding part having an external power supply device attached thereto enhances the intensity of the optical signal to be emitted by the optical signal emitting part. Thus, the power of the external power supply device can be utilized to enhance the intensity of the optical signal, so that reliable communication can be realized without reducing the light amount during main light emission.

(3) The communication intensity deciding part is provided for enhancing the intensity of the optical signal to be emitted by the optical signal emitting part upon determining that preliminary slave light has not been emitted. Therefore, even in a case where an optical signal does not reach a slave flash device, the communication will be made possible.

(4) The signal emitting part can also emit a flash serving as illumination during photographing. This enables changing of the intensity of the optical signal upon balanced usage of power for the optical signal and for the illumination taken in to account, so that efficient power usage can be realized and the master and slave flash devices can be employed in a broader range.

(5) The communication intensity deciding part signal, being set not to illuminate at the photographing intensity, enhances the signal intensity of the optical signal emitting part. Accordingly, used exclusively for the communication, the optical signal emitting part is able to most effectively utilize the power.

(6) The communication intensity deciding part is provided for deciding, based on a photometry result of the photometry part, the intensity of the optical signal to be emitted by the signal emitting part. Therefore, when the subject field has high brightness, it is possible to enhance the intensity of the optical signal in order to prevent the optical signal from being hidden in the brightness of the subject field, thereby realizing secure communication.

(7) The photographing device sets the intensity of the optical signal to be emitted by the dedicated signal emission device to a value larger than the intensity of the optical signal to be emitted by the light/signal emission device. Therefore, the use of the dedicated signal can realize more secure communication at longer distance.

(8) In the photographing device and/or signal emission device provided are the photometry part that photometers the brightness of the subject field, and the communication intensity deciding part that decides, based on a photometry result of the photometry part, the intensity of the optical signal to be emitted by the signal emitting part. Therefore, when the subject field has high brightness, it is possible to enhance the intensity of the optical signal in order to prevent the optical signal from being hidden in the brightness of the subject field, thereby realizing secure communication.

(9) When the signal emitting part is set not to perform illumination during photographing, the communication intensity deciding part sets the signal intensity of the optical signal emitting part to a value larger than that when the signal emitting part performs illumination during photographing. This enables proper control of the slave flash devices even when the distance to the slave flash devices is large, or when surrounding environment obstructs lines of sight between the signal emitting part and the slave SBs at the photographing and hence the communication therebetween has to be made by using light emission pulses as reflected from a peripheral object or the like.

(10) While the slave flash devices are set to be controlled, the communication intensity deciding part inhibits the signal emitting part from illuminating during photographing. This enables proper control of the slave flash devices even when the distance to the slave flash devices is large, or when surrounding environment obstructs lines of sight between the signal emitting part and the slave SBs at the photographing and hence the communication has to be made by using light emission pulses as reflected from a peripheral object or the like.

(11) The signal emitting part is a flash device built in the photographing device. Therefore, it is able to properly control the slave flash devices even if the light emission power thereof is small.

(12) When an external flash device attached to the photographing device as a signal emitting part has a light emission power capacity greater than a predetermined value, the signal emitting part is not inhibited from illuminating at the photographing. Thus, it is able for the signal emitting part to always control the slave flash devices properly, and to emit main light, if possible, thereby improving usability.

What is claimed is:

1. A flash control device for controlling a slave flash device that emits a flash upon receipt of an operational instruction via optical communication, comprising:
a signal emitting part for emitting an optical signal used for the optical communication;
a power determining part for determining a state of power supply to be used for light emission of said signal emitting part; and
a communication intensity deciding part for deciding, according to a determination result from said power determining part, intensity of the optical signal to be emitted by said signal emitting part.

2. The flash control device according to claim 1, wherein said signal emitting part is able to emit a flash serving as illumination at the time of photographing.

3. The flash control device according to claim 2, wherein said communication intensity deciding part increases signal intensity of said optical signal emitting part when illumination is not set to be provided at the time of photographing.

4. The flash control device according to claim 1, wherein when the flash control device is provided with an external power supply device in exterior thereof for additional power supply to be used for the light emission of said signal emitting part, said communication intensity deciding part increases the intensity of the optical signal to be emitted by said optical signal emitting part.

5. The flash control device according to claim 4, wherein said signal emitting part is able to emit a flash serving as illumination at the time of photographing.

6. The flash control device according to claim 5, wherein said communication intensity deciding part increases signal intensity of said optical signal emitting part when illumination is not set to be provided at the time of photographing.

7. A flash control device for controlling a slave flash device that emits a flash upon receipt of an operational instruction via optical communication, comprising:
a signal emitting part for emitting an optical signal used for the optical communication;
a slave flash determining part for determining whether or not said slave flash device has emitted preliminary slave light, in accordance with an optical signal emitted by said signal emitting part; and
a communication intensity deciding part for increasing intensity of the optical signal to be emitted by said optical signal emitting part when said slave flash determining part determines that said preliminary slave light has not been emitted.

8. The flash control device according to claim 7, wherein said signal emitting part is able to emit a flash serving as illumination at the time of photographing.

9. The flash control device according to claim 8, wherein said communication intensity deciding part increases signal intensity of said optical signal emitting part when illumination is not set to be provided at the time of photographing.

10. A flash control device for controlling a slave flash device that emits a flash upon receipt of an operational instruction via optical communication, comprising:
a signal emitting part for emitting an optical signal used for the optical communication;
a photometry part for measuring brightness of a subject field; and
a communication intensity deciding part for deciding, according to a measurement result from said photometry part, intensity of the optical signal to be emitted by said signal emitting part.

11. A flash control system comprising: a photographing device; a slave flash device emitting a flash upon receipt of an operational instruction via optical communication; and a signal emitting part for emitting an optical signal used for the optical communication, the flash control system further comprising:
said signal emitting part attached to said photographing device, and changeably functioning as a light/signal emission device capable of emitting a flash serving as illumination at the time of photographing, and a dedicated signal emission device capable of emitting the optical signal to only give an operational instruction to said slave flash device, wherein
said photographing device sets intensity of the optical signal to be emitted by said dedicated signal emission device to be greater than the intensity of the optical signal to be emitted by said light/signal emission device.

12. A flash control system comprising a photographing device; a slave flash device emitting a flash upon receipt of an operational instruction via optical communication; and a signal emission device attached to said photographing device and having a signal emitting part for emitting an optical signal used for the optical communication, the flash control system further comprising:
a photometry part provided in said photographing device and/or in said signal emission device, for measuring brightness of a subject field; and
a communication intensity deciding part for deciding, according to a measurement result from said photometry part, intensity of the optical signal to be emitted by said signal emitting part.

13. A flash control device for controlling a slave flash device that emits a flash upon receipt of an operational instruction via optical communication, comprising:
a signal emitting part capable of emitting an optical signal used for the optical communication and of emitting a flash serving as illumination at the time of photographing; and
a communication intensity deciding part for deciding intensity of the optical signal to be emitted by said signal emitting part, wherein
when said signal emitting part does not illuminate at the time of photographing, said communication intensity deciding part sets signal intensity of said optical signal emitting part to be greater than when said signal emitting part illuminates at the time of photographing.

14. A flash control device for controlling a slave flash device that emits a flash upon receipt of an operational instruction via optical communication, comprising:
a signal emitting part capable of emitting an optical signal used for the optical communication and of emitting a flash serving as illumination at the time of photographing; and a communication intensity deciding part for deciding intensity of the optical signal to be emitted by said signal emitting part, wherein when the slave flash device is set to be controlled, said communication intensity deciding part inhibits said signal emitting part from illuminating at the time of photographing.

15. The flash control device according to claim 14, wherein said signal emitting part is a flash device built in the photographing device.

16. The flash control device according to claim 14, wherein said communication intensity deciding part does not inhibit said signal emitting part from illuminating at the time of photographing when the photographing device is provided with an external flash device as the signal emitting part which has a light emission capacity greater than a predetermined value, even when the slave flash device is set to be controlled.

* * * * *